United States Patent
Morii et al.

(10) Patent No.: US 9,166,511 B2
(45) Date of Patent: Oct. 20, 2015

(54) CONTROL SYSTEM FOR AC MOTOR

(71) Applicants: Akiyoshi Morii, Obu (JP); Tetsuya Nomura, Obu (JP); Makoto Nakamura, Okazaki (JP); Mikio Yamazaki, Toyota (JP)

(72) Inventors: Akiyoshi Morii, Obu (JP); Tetsuya Nomura, Obu (JP); Makoto Nakamura, Okazaki (JP); Mikio Yamazaki, Toyota (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 86 days.

(21) Appl. No.: 14/073,405

(22) Filed: Nov. 6, 2013

(65) Prior Publication Data
US 2014/0159622 A1   Jun. 12, 2014

(30) Foreign Application Priority Data
Dec. 12, 2012   (JP) ................. 2012-271237

(51) Int. Cl.
| H02P 27/00 | (2006.01) |
| H02P 21/00 | (2006.01) |
| H02P 6/14  | (2006.01) |
| H01H 3/26  | (2006.01) |
| B04B 13/00 | (2006.01) |

(52) U.S. Cl.
CPC ............ *H02P 21/0085* (2013.01); *H02P 6/142* (2013.01); *B04B 13/003* (2013.01); *H01H 3/26* (2013.01)

(58) Field of Classification Search
CPC ........ H01H 3/26; B04B 13/003; B23Q 5/341; G02B 6/4452; G09F 19/02
USPC .............................................. 318/3
See application file for complete search history.

(56) References Cited

U.S. PATENT DOCUMENTS

| 2007/0290633 | A1  | 12/2007 | Atarashi et al. |
| 2010/0301788 | A1* | 12/2010 | Chen et al. ............ 318/400.3 |
| 2012/0173066 | A1  | 7/2012  | Yamada et al. |
| 2012/0249024 | A1* | 10/2012 | Saha et al. ........... 318/400.02 |

FOREIGN PATENT DOCUMENTS

| JP | A-2006-311768 | 11/2006 |
| JP | A-2007-325397 | 12/2007 |
| JP | A-2010-210050 | 9/2010  |
| JP | A-2011-061921 | 3/2011  |
| JP | A-2012-110189 | 6/2012  |

\* cited by examiner

*Primary Examiner* — Kawing Chan
*Assistant Examiner* — Bradley Brown
(74) *Attorney, Agent, or Firm* — Oliff PLC

(57) ABSTRACT

A converter controls a system voltage, which is a DC link voltage of an inverter, in accordance with a voltage command value. The inverter outputs a rectangular wave voltage having the system voltage as amplitude to an AC motor during application of rectangular wave voltage control. During application of rectangular wave voltage control, a voltage command value for the system voltage is modified such that a current phase on a d-q plane of the AC motor is brought closer to a target current phase line. The target current phase line is set on an advance side relative to an optimal current phase line which is a set of current phases at which output torque is maximized for the same amplitude of a motor current in the AC motor.

10 Claims, 16 Drawing Sheets

FIG.2

| CONTROL SCHEME | SINE WAVE PWM | OVERMODULATION PWM | RECTANGULAR WAVE (1 PULSE) |
|---|---|---|---|
| WAVEFORM OF OUTPUT VOLTAGE FROM INVERTER | FUNDAMENTAL WAVE COMPONENT | FUNDAMENTAL WAVE COMPONENT | FUNDAMENTAL WAVE COMPONENT |
| DEGREE OF MODULATION | 0~0.61 | 0.61~0.78 | 0.78 |
| CHARACTERISTIC | SMALL TORQUE FLUCTUATION | IMPROVEMENT IN OUTPUT IN INTERMEDIATE-SPEED REGION | IMPROVEMENT IN OUTPUT IN HIGH-SPEED REGION |
| SWITCHING LOSS AT THE SAME VOLTAGE·CURRENT | GREAT | INTERMEDIATE | SMALL |

CONTROL SYSTEM FOR AC MOTOR

This nonprovisional application is based on Japanese Patent Application No, 2012-271237 filed on Dec. 12, 2012 with the Japan Patent Office, the entire contents of which are hereby incorporated by reference.

BACKGROUND OF THE INVENTION

1. Field of the Invention

This invention relates to a control system for an AC motor and more particularly to a control system variably controlling a DC link voltage of an inverter driving the AC motor with the use of a converter.

2. Description of the Background Art

In order to control an AC motor with the use of a DC power supply, a control system including an inverter has generally been employed. For example, as described also in Japanese Patent Laying-Open No. 2006-311768 (hereinafter referred to as "PTD 1"), a configuration variably controlling a DC link voltage of an inverter with the use of a boost converter has been known. Thus, as an output voltage from a boost converter (that is, a DC link voltage of an inverter) is boosted from an output voltage from a DC power supply (representatively, a battery), the AC motor can advantageously be driven at higher torque and higher rotation.

PTD 1 above describes variable control of a voltage on a DC link side of an inverter, that is, an output voltage from a boost converter, so as to maintain a modulation factor in a specific control scheme at a target value during control of an AC motor in which pulse width modulation (PWM) control and rectangular wave voltage control are selectively applied. By doing so, loss in the overall system can be lowered by maintaining the modulation factor (degree of modulation) at the target value.

SUMMARY OF INVENTION

As in PTD 1 above, in the control system including a boost converter, an inverter, and an AC motor, operating the AC motor with an output voltage from the boost converter being lowered, with what is called rectangular wave voltage control in which a one-pulse rectangular wave voltage is applied, is advantageous for lowering switching loss in the boost converter and the inverter. Rectangular wave voltage control, however, is voltage phase control under field-weakening control. Therefore, if a voltage phase is made greater for increasing output torque, motor loss increases due to increase in field-weakening current.

On the other hand, when an output voltage from the boost converter is raised and the AC motor is operated under PWM control, motor loss can be lowered, whereas loss in the converter and the inverter increases due to switching loss resulting from increase in the number of times of switching.

Therefore, how to set an output voltage from a boost converter becomes an issue for lowering loss in the overall system. In PTD 1, loss is minimized by setting an output voltage (a system voltage) from the boost converter so as to maintain a target modulation factor found in advance.

While rectangular wave voltage control is applied, however, a modulation factor is fixed to a constant value (0.78), and hence an output voltage (a system voltage) from the boost converter cannot be set with control for maintaining a modulation factor at a target value as in PTD 1.

The present invention was made in order to solve such a problem, and an object of this invention is to set a DC link voltage of an inverter (an output voltage from a boost converter) so as to suppress loss in an overall control system in a case where the control system configured to variably control a DC link voltage of the inverter with the use of a boost converter controls an AC motor with rectangular wave voltage control.

According to one aspect of this invention, a control system for an AC motor includes a boost converter, an inverter, and a voltage command value setting portion. The boost converter is configured to carry out DC power conversion between a DC power supply and a power line such that a DC voltage of the power line is controlled in accordance with a voltage command value. The inverter is configured to convert a DC voltage on the power line to an AC voltage to be applied to an AC motor. The voltage command value setting portion is configured to modify the voltage command value in accordance with a current phase on a d-q axis plane of a motor current which flows through the AC motor during application of rectangular wave voltage control in which a rectangular wave voltage is applied from the inverter to the AC motor and output torque of the AC motor is controlled by a voltage phase of the rectangular wave voltage. The voltage command value setting portion modifies the voltage command value such that the current phase is brought closer to a target current phase line. The target current phase line is set on the d-q axis plane, on an advance side relative to an optimal current phase line which is a set of current phases at which output torque is maximized with respect to the same amplitude of the motor current.

Preferably, the voltage command value setting portion is configured to vary the target current phase line in accordance with a state of load of the AC motor. Further preferably, the voltage command value setting portion is configured to vary the target current phase line toward the advance side relative to the optimal current phase line as the load of the AC motor is lower, while it is configured to bring the target current phase line closer to the optimal current phase line as load of the AC motor is higher.

In addition, preferably, the control system is configured such that a plurality of AC motors are electrically connected to a common power line through a plurality of inverters, respectively. The voltage command value setting portion includes a calculation portion and a modification portion. The calculation portion calculates an amount of voltage modification in accordance with a difference between the target current phase line set in accordance with a state of load of the AC motor for each AC motor and the present current phase, for each of the plurality of AC motors. The modification portion modifies the voltage command value based on a maximum value of the amounts of voltage modification for respective ones of the plurality of AC motors.

Further preferably, the voltage command value setting portion sets, in accordance with a load ratio among the plurality of AC motors, the target current phase line of the AC motor relatively low in load toward the advance side, while it sets the target current phase line of the AC motor relatively high in load toward a retard side.

Preferably, the voltage command value setting portion modifies the voltage command value so as to raise the DC voltage when the current phase is on the advance side relative to the target current phase line, while it modifies the voltage command value so as to lower the DC voltage when the current phase is on the retard side relative to the target current phase line.

In addition, preferably, output torque of the AC motor is controlled with feedback control of the motor current during application of pulse width modulation control in which an AC voltage in accordance with pulse width modulation control is applied from the inverter to the AC motor. Then, a current command value in feedback control is set to have a current phase on the optimal current phase line.

According to the above control system for an AC motor, in a case where a control system configured to variably control a DC link voltage of an inverter with the use of a boost converter controls an AC motor with rectangular wave voltage control, loss in the overall control system can be suppressed by appropriately setting a DC link voltage of the inverter (an output voltage from a boost converter).

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram illustrating a control mode for controlling the AC motor.

DESCRIPTION OF THE PREFERRED EMBODIMENTS

Figure 1:
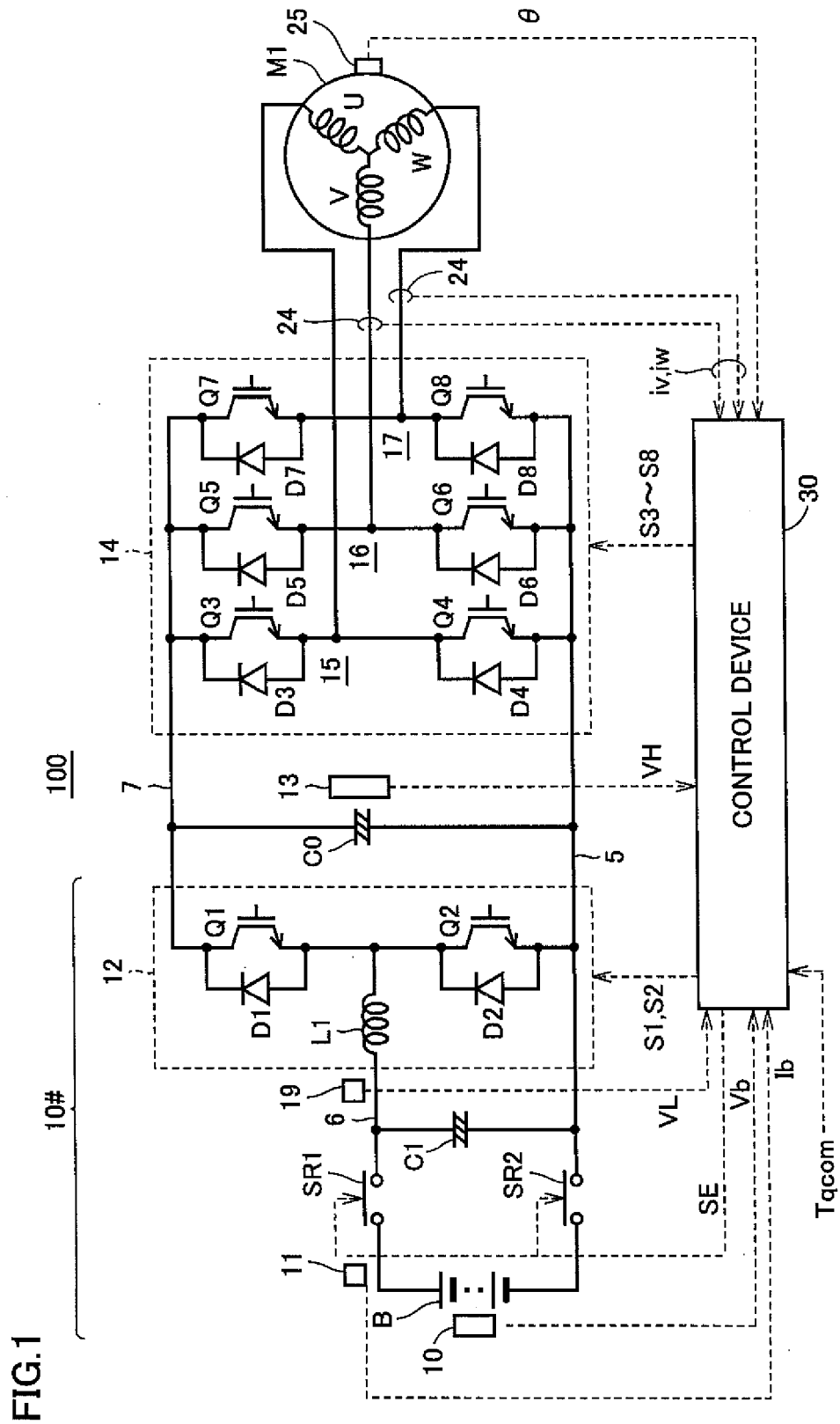
FIG. 1 is a diagram of an overall configuration of a control system for an AC motor according to a first embodiment of the present invention.

An embodiment of the present invention will be described hereinafter in detail with reference to the drawings. It is noted that, in the description below, the same or corresponding elements in the drawings below have the same reference characters allotted and description thereof will not be repeated in principle.

First Embodiment (System Configuration)

FIG. 1 is a diagram of an overall configuration of a control system for an AC motor according to a first embodiment of the present invention.

Referring to FIG. 1, a control system 100 which is to control an AC motor M1 includes a DC voltage generation portion 10#, a smoothing capacitor C0, an inverter 14, and a control device 30.

AC motor M1 is, for example, a traction motor configured to generate torque in a drive wheel of an electrically-powered vehicle (comprehensively expressing a car capable of generating vehicle driving force with electric energy, such as a hybrid car, an electric car, and a fuel cell car). Alternatively, this AC motor M1 may be configured to have a function as a generator driven by an engine and may be configured to function as both of a motor and a generator. In addition, AC motor M1 may operate as a motor for an engine, and for example, may be incorporated in a hybrid car as a component being able to start the engine. Namely, in the present embodiment, the "AC motor" includes a motor, a generator, and a motor generator which are AC-driven.

DC voltage generation portion 10# includes a DC power supply B, system relays SR1, SR2, a smoothing capacitor C1, and a boost converter 12.

DC power supply B is implemented representatively by such a rechargeable power storage device as a secondary battery such as a nickel metal hydride battery or a lithium ion battery, and an electric double layer capacitor. A DC voltage VL output from DC power supply B and an input and output DC current Ib are sensed by a voltage sensor 10 and a current sensor 11, respectively.

System relay SR1 is connected between a positive electrode terminal of DC power supply B and a power line 6, and system relay SR2 is connected between a negative electrode terminal of DC power supply B and a power line 5. System relay SR1, SR2 is turned on/off by a signal SE from control device 30.

Boost converter 12 includes a reactor L1 and power semiconductor switching elements Q1, Q2. Power semiconductor switching elements Q1 and Q2 are connected in series between a power line 7 and power line 5. On and off of power semiconductor switching elements Q1 and Q2 is controlled by switching control signals S1 and S2 from control device 30.

In this embodiment of the invention, an IGBT (Insulated Gate Bipolar Transistor), a power MOS (Metal Oxide Semiconductor) transistor, a power bipolar transistor, or the like can be employed as the power semiconductor switching element (hereinafter simply referred to as a "switching element"). Anti-parallel diodes D1, D2 are arranged for switching elements Q1, Q2, respectively. Reactor L1 is connected between a connection node of switching elements Q1 and Q2 and power line 6. In addition, smoothing capacitor C0 is connected between power line 7 and power line 5.

Smoothing capacitor C0 smoothes a DC voltage of power line 7. A voltage sensor 13 detects a voltage across opposing ends of smoothing capacitor C0, that is, a DC voltage VH on power line 7. DC voltage VH corresponding to a DC link voltage of inverter 14 will hereinafter also be referred to as a "system voltage VH." On the other hand, DC voltage VL of power line 6 is detected by a voltage sensor 19. DC voltages VH, VL detected by voltage sensors 13, 19, respectively, are input to control device 30.

Inverter 14 is constituted of upper and lower arms 15 of a U-phase, upper and lower arms 16 of a V-phase, and upper and lower arms 17 of a W-phase, provided in parallel between power line 7 and power line 5. The upper and lower arms of each phase are constituted of switching elements connected in series between power line 7 and power line 5. For example, upper and lower arms 15 of the U-phase are constituted of switching elements Q3, Q4, upper and lower arms 16 of the V-phase are constituted of switching elements Q5, Q6, and upper and lower arms 17 of the W-phase are constituted of switching elements Q7, Q8. In addition, anti-parallel diodes D3 to D8 are connected to switching elements Q3 to Q8, respectively. On and off of switching elements Q3 to Q8 is controlled by switching control signals S3 to S8 from control device 30, respectively.

Representatively, AC motor M1 is a three-phase permanent magnet type synchronous motor, and it is constituted such that one ends of three coils of the U-, V-, and W-phases are commonly connected to a neutral point. In addition, the other ends of the coils of respective phases are connected to intermediate points of switching elements of upper and lower arms 15 to 17 of respective phases.

Boost converter 12 is basically controlled such that switching elements Q1 and Q2 are complementarily and alternately turned on and off in each switching cycle corresponding to one cycle of a carrier wave (not shown) used for PWM control. Boost converter 12 can control a boost ratio (VH/VL) by controlling a ratio between ON periods (a duty ratio) of switching elements Q1, Q2. Therefore, on and off of switching elements Q1, Q2 is controlled in accordance with a duty ratio operated in accordance with detection values of DC voltages VL, VH and a voltage command value VHr.

By complementarily turning on and off switching element Q1 and switching element Q2, charging and discharging of DC power supply B can both be addressed without switching control in accordance with a direction of a current through reactor L1. Namely, through control of system voltage VH in accordance with voltage command value VHr, boost converter 12 can address both of regeneration and power running.

It is noted that, while output from AC motor M1 is low, AC motor M1 can be controlled in a state of VH=VL (a boost ratio=1.0) without boost by boost converter 12. In this case (hereinafter also referred to as "a non-boost mode"), switching elements Q1 and Q2 are fixed to on and off, respectively, and hence electric power loss in boost converter 12 is lowered.

In a case where a torque command value of AC motor M1 is positive (Tqcom>0), when a DC voltage is supplied from smoothing capacitor C0, inverter 14 converts the DC voltage through a switching operation of switching elements Q3 to Q8 in response to switching control signals S3 to S8 from control device 30 and drives AC motor M1 so as to output positive torque. Alternatively, in a case where a torque command value of AC motor M1 is zero (Tqcom=0), inverter 14 converts a DC voltage to an AC voltage through a switching operation in response to switching control signals S3 to S8 and drives AC motor M1 such that torque attains to zero. Thus, AC motor M1 is driven to generate zero or positive torque designated by a torque command value Tqcom.

In addition, during regenerative braking of an electrically-powered vehicle incorporating control system 100, torque command value Tqcom of AC motor M1 is set to negative (Tqcom<0). In this case, inverter 14 converts an AC voltage generated by AC motor M1 to a DC voltage through a switching operation in response to switching control signals S3 to S8, and supplies the resultant DC voltage (system voltage VH) to boost converter 12 through smoothing capacitor C0.

It is noted that regenerative braking herein includes braking accompanying regeneration when a driver driving an electrically-powered vehicle operates a foot brake, and deceleration (or stop of acceleration) of a vehicle while carrying out regeneration, in which an accelerator pedal is off during running although a foot brake is not operated.

A current sensor 24 detects a current (a phase current) which flows through AC motor M1 and outputs the detection value to control device 30. It is noted that, since the sum of instantaneous values for three-phase currents iu, iv, iw is zero, the current sensors may be arranged to detect motor currents of two phases as shown in FIG. 1 (for example, a V-phase current iv and a W-phase current iw).

A rotation angle sensor (resolver) 25 detects an angle of rotation θ of a rotor of AC motor M1, and sends detected angle of rotation θ to control device 30. Control device 30 can calculate a rotation speed Nmt and a rotation angle velocity ω of AC motor M1 based on angle of rotation θ. It is noted that rotation angle sensor 25 does not have to be arranged, by directly operating angle of rotation θ based on a motor voltage or a current in control device 30.

Control device 30 is configured with an electronic control unit (ECU) and it controls an operation of control system 100 through software processing in which a not-shown CPU (Central Processing Unit) executes a program stored in advance and/or through hardware processing using dedicated electronic circuitry.

As a representative function, control device 30 controls an operation of boost converter 12 and inverter 14 such that AC motor M1 outputs torque in accordance with torque command value Tqcom with a control scheme which will be described later, based on input torque command value Tqcom, DC voltage VL detected by voltage sensor 19, DC current Ib detected by current sensor 11, system voltage VH detected by voltage sensor 13, motor currents iu (iu=−(iv+iw)), iv, iw detected by current sensor 24, angle of rotation θ from rotation angle sensor 25, and the like.

Namely, in order to control DC voltage VH in accordance with voltage command value VHr as above, control device 30 generates switching control signals S1, S2 for boost converter 12. In addition, control device 30 generates switching control signals S3 to S8 for controlling output torque from AC motor M1 in accordance with torque command value Tqcom. Switching control signals S1 to S8 are input to boost converter 12 and inverter 14.

(Control Mode in Motor Control)

FIG. 2 is a diagram illustrating a control mode for controlling the AC motor.

As shown in FIG. 2, in the control system for the AC motor according to the embodiment of the present invention, three control modes are switched for use for control of an AC motor by inverter 14.

Sine wave PWM control is used as general PWM control, in which on and off of a switching element in the arm of each phase is controlled based on voltage comparison between a sinusoidal voltage command value and a carrier wave (representatively, a triangular wave). Consequently, regarding a set of a high-level period corresponding to an ON period of an element in the upper arm and a low-level period corresponding to an ON period of an element in the lower arm, a duty ratio is controlled such that a fundamental wave component thereof exhibits a sine wave within a certain period.

Hereinafter, a ratio of an AC voltage (an effective value of a line voltage) output to AC motor M1 to a DC link voltage (system voltage VH) in DC-AC voltage conversion by an inverter will herein be defined as a "degree of modulation." Application of sine wave PWM control is basically limited to a state where AC voltage amplitude (a phase voltage) of each phase is equal to system voltage VH. Namely, in sine wave PWM control, a degree of modulation can be increased only up to around 0.61.

Overmodulation PWM control refers to control for carrying out PWM control the same as sine wave PWM control above for an AC voltage (sinusoidal) greater in amplitude than a carrier wave, with that amplitude being increased. Consequently, by distorting a fundamental wave component, a degree of modulation can be raised to a range from 0.61 to 0.78. Thus, PWM control can be applied also to a part of a region where AC voltage amplitude of each phase (a phase voltage) is higher than system voltage VH.

In sine wave PWM control and overmodulation PWM control, an AC voltage output from inverter 14 to AC motor M1 is controlled with feedback control of a motor current which flows through AC motor M1. Specifically, an AC voltage applied to AC motor M1 is controlled such that a d-axis current Id and a q-axis current Iq obtained by subjecting motor currents of three phases to d-q conversion are controlled to current command values Idcom and Iqcom set in accordance with torque command value Tqcom. It is noted that both of sine wave PWM control and overmodulation PWM control are hereinafter comprehensively simply also referred to as PWM control.

On the other hand, in rectangular wave voltage control, an inverter outputs one pulse of a rectangular wave having a ratio between a high-level period and a low-level period of 1:1 within a period corresponding to 360 degrees of an electric angle of the motor. Thus, a degree of modulation can be raised up to 0.78. In rectangular wave voltage control, a degree of modulation is fixed to 0.78.

Figure 3:
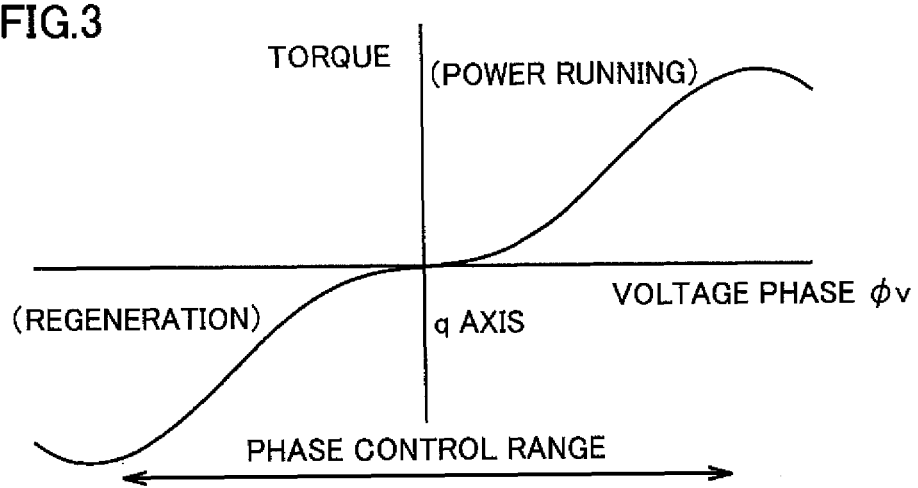
FIG. 3 is a first conceptual diagram illustrating voltage phase-torque characteristics in rectangular wave voltage control.
Figure 4:
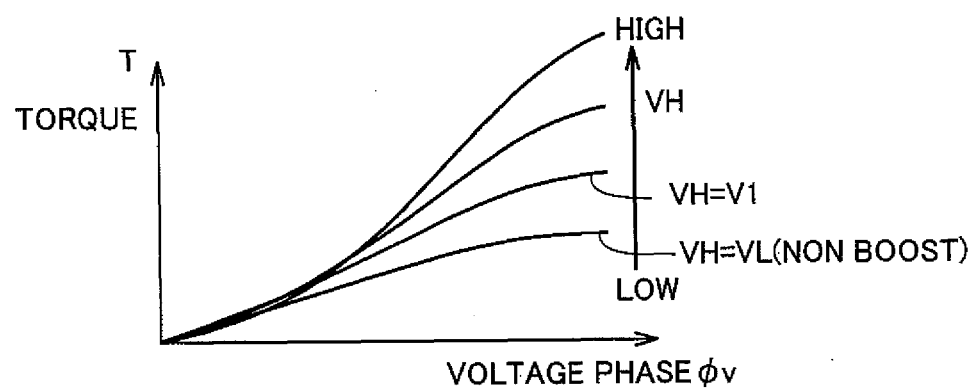
FIG. 4 is a second conceptual diagram illustrating voltage phase-torque characteristics in rectangular wave voltage control.

FIGS. 3 and 4 show voltage phase-torque characteristics in rectangular wave voltage control.

Referring to FIG. 3, during rectangular wave voltage control, output torque from AC motor M1 is controlled by varying a voltage phase φv of a rectangular wave voltage. As voltage phase φv is advanced with respect to the q-axis, power running torque can be increased. On the other hand, during a regenerative operation (negative torque output), regenerative torque can be increased by retarding voltage phase φv with respect to the q-axis.

FIG. 4 shows in detail characteristics during a power running operation (positive torque output). It is noted that, by inverting polarity of voltage phase φv with the q-axis serving as the reference, output torque of AC motor M1 can be controlled similarly also during a regenerative operation (negative torque output).

Output torque T from AC motor M1 in rectangular wave voltage control varies in accordance with the following equation (1), based on a state of operation of AC motor M1:

$$T = \frac{1}{2} \frac{p(L_d - L_q)}{\omega^2 L_d L_q} V^2 \sin 2\theta + \frac{p\phi k V}{\omega L_d} \sin\theta \quad (1)$$

where p represents the number of pole pairs, Ld, Lq represent inductor components on the d-axis and the q-axis, respectively, θ represents a voltage phase (θ=φv), and φk represents an induced voltage constant. These are motor constants. In addition, V represents a motor application voltage (V=VH) and ω represents a rotation angle velocity.

FIG. 4 shows voltage phase-torque characteristics in each case of variation in system voltage VH at a constant rotation speed (ω being constant).

As understood from FIG. 4, as system voltage VH is higher with respect to the same voltage phase φv, output torque is greater. Therefore, when high torque is demanded, output torque with respect to the same voltage phase control range can be ensured by raising system voltage VH by using boost converter 12.

On the other hand, as described above, in a non-boost mode (VH=VL), switching loss is lowered and hence efficiency of boost converter 12 is higher. In contrast, as boost converter 12 is caused to perform a boost operation (VH>VL), efficiency of boost converter 12 relatively lowers due to switching loss in switching elements Q1, Q2.

In addition, in a case where the same motor current is supplied while system voltage VH is the same, that is, a DC voltage switched by the inverter is the same, switching loss in the inverter is dependent on the number of times of switching within a unit time period. Therefore, under the same condition as such, switching loss is greater in sine wave PWM control, whereas switching loss is less in rectangular wave voltage control.

In the control system for the AC motor according to the present embodiment, in accordance with a state of AC motor M1, sine wave PWM control, overmodulation PWM control, and rectangular wave voltage control shown in FIG. 2 are selectively applied.

Figure 5:
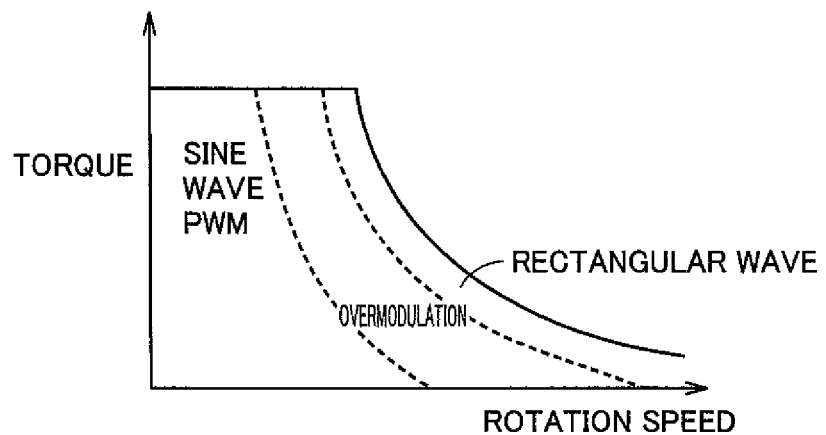
FIG. 5 is a conceptual diagram schematically showing relation between an operation point of the AC motor and selection of a control mode.

Generally, as shown in FIG. 5, a control mode is switched in accordance with an operation point of AC motor M1 (combination of torque and a rotation speed).

Referring to FIG. 5, in general, sine wave PWM control is applied from a low-speed rotation region to an intermediate-speed rotation region, and overmodulation control is applied from the intermediate-speed rotation region to a high-speed rotation region. In addition, AC motor M1 is controlled by applying rectangular wave voltage control in a higher-speed rotation region. It is noted that PWM control (sine wave PWM or overmodulation PWM) and rectangular wave voltage control are selected in accordance with a degree of modulation. On the other hand, even at the same motor application voltage, a degree of modulation varies as system voltage VH varies, and thus an applied control mode differs.

Thus, in order to smoothly drive AC motor M1, system voltage VH should appropriately be set in accordance with an operation point of AC motor M1 (a rotation speed and torque). Here, as described above, a realizable degree of modulation is limited for each control mode. Therefore, as output from AC motor M1 represented by a product of a rotation speed and torque is greater, system voltage VH should be raised.

Figure 6:
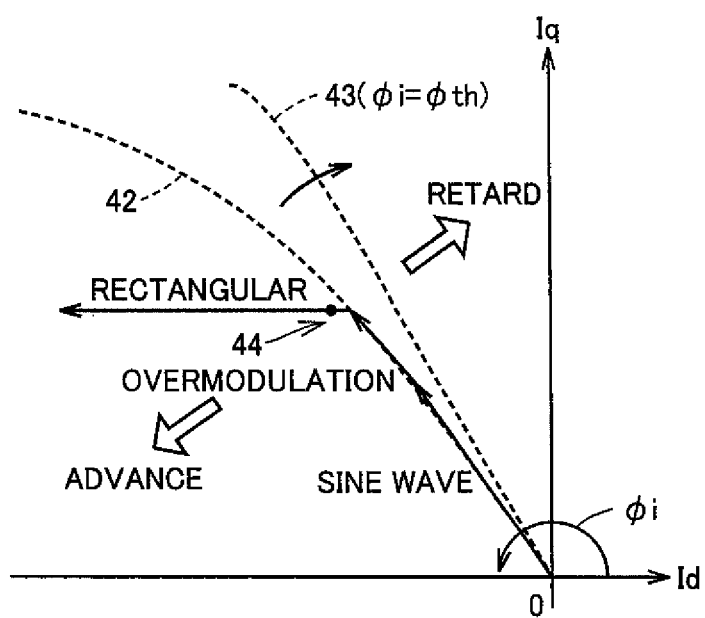
FIG. 6 is a graph showing a current phase of the AC motor in each control mode.

FIG. 6 is a graph showing a current phase of AC motor M1 in each control mode.

Figure 8:
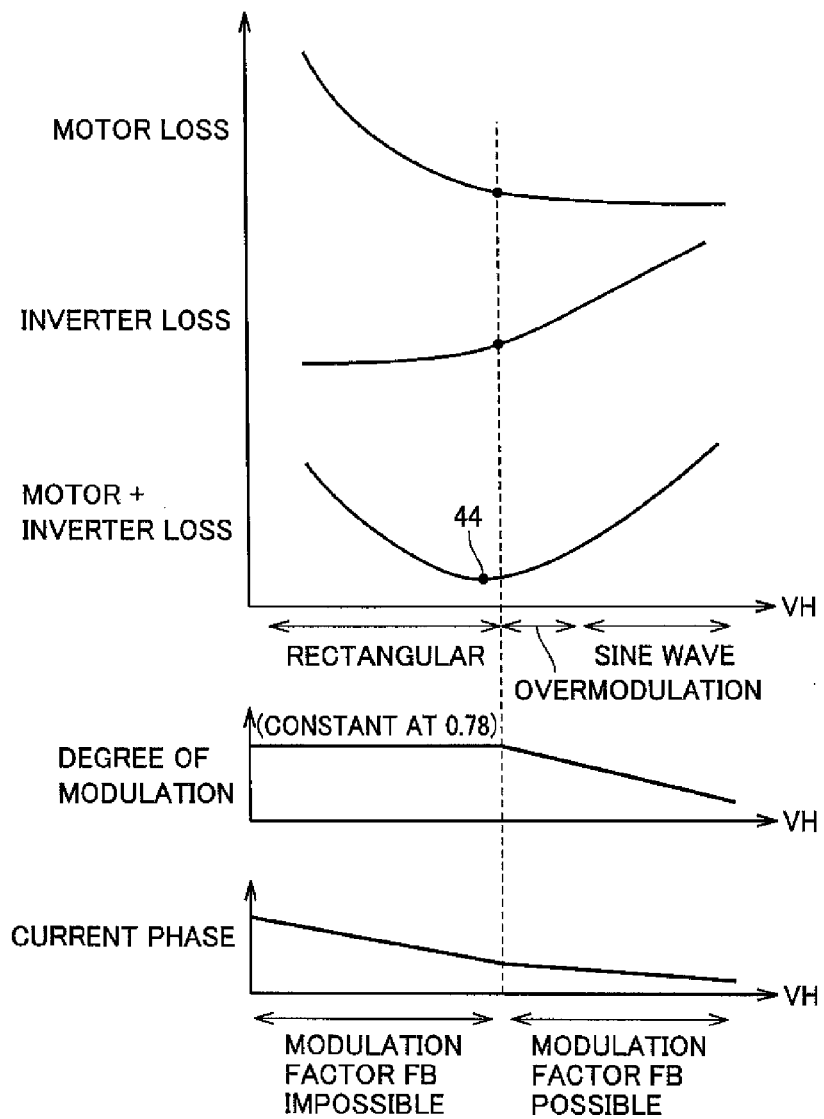
FIG. 8 is a conceptual diagram for illustrating a behavior of the control system in accordance with variation in a system voltage throughout three control modes.

FIG. 6 exemplifies a trace of variation in current phase while output torque is gradually increased for the same DC voltage VH. The abscissa in FIG. 8 represents d-axis current Id and the ordinate in FIG. 6 represents q-axis current Iq. A current phase $\phi i$ is defined in an equation (2) below.

$$\tan\phi i = \frac{I_q}{I_d} \tag{2}$$

In sine wave PWM control and overmodulation PWM control, current phase $\phi i$ is determined to be located on an optimal current phase line 42. Optimal current phase line 42 is drawn on an Id-Iq plane, as a set of current phases at which output torque is maximized with respect to the same amplitude of a motor current. Namely, optimal current phase line 42 corresponds to a set of current phase points where loss in AC motor M1 on an equal torque line on the Id-Iq plane serves as the reference. Optimal current phase line 42 can be found through experiments or simulation in advance.

Current command values on the d-axis and the q-axis (Idcom, Iqcom) in current feedback control in PWM control are set to current values on the d-axis and the q-axis corresponding to a point of intersection between the equal torque line corresponding to torque command value Tqcom and optimal current phase line 42. For example, a map for PWM control determining combination of current command values Idcom, Iqcom on optimal current phase line 42 in correspondence with each torque command value can be created in advance and stored in control device 30.

FIG. 6 shows with an arrow, a trace along which a position of a tip end of a current vector (a current phase) resulting from combination of Id, Iq having a zero point position as an origin varies with increase in output torque. With increase in output torque, magnitude of a current (corresponding to magnitude of a current vector on the Id-Iq plane) increases. In sine wave PWM control and overmodulation PWM control, a current phase is controlled to be located on optimal current phase line 42 by setting of current command values Idcom, Iqcom. As the torque command value further increases and a degree of modulation reaches 0.78, rectangular wave voltage control is applied.

In rectangular wave voltage control, an absolute value of d-axis current Id which is a field current increases with increase in output torque by making voltage phase $\phi v$ greater, in order to carry out field-weakening control. Consequently, a position of the tip end of the current vector (the current phase) is away from optimal current phase line 42 to the left in the figure (toward an advance side), and thus loss in AC motor M1 increases. Thus, in rectangular wave voltage control, inverter 14 cannot directly control a current phase of AC motor M1.

In contrast, as output torque is decreased by making voltage phase $\phi v$ smaller at the same system voltage VH, current phase $\phi i$ varies to the right in the figure (toward a retard side). Then, when current phase $\phi i$ is located on the retard side relative to a mode switching line 43 during rectangular wave voltage control, transition from rectangular wave voltage control to PWM control is indicated. For example, mode switching line 43 is drawn as a set of current phase points at which relation of $\phi i = \phi th$ (a reference value) is satisfied. In other words, when current phase $\phi i$ is smaller than $\phi th$ (the reference value), transition from rectangular wave voltage control to PWM control is indicated.

Figure 7:
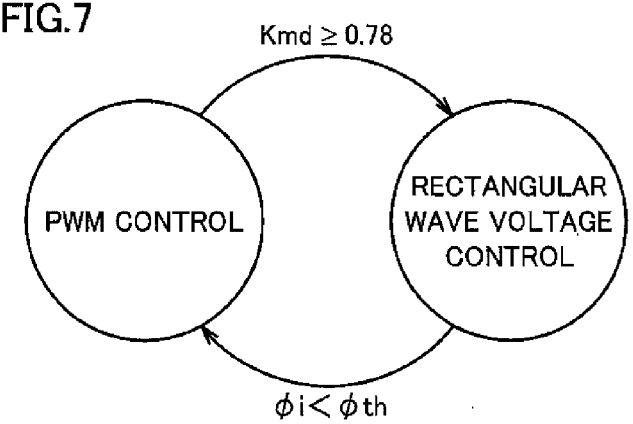
FIG. 7 is a transition diagram for illustrating mode switching between PWM control and rectangular wave voltage control.

FIG. 7 shows a transition diagram for illustrating mode switching between PWM control and rectangular wave voltage control.

Referring to FIG. 7, during application of PWM control (sine wave PWM or overmodulation PWM control), a degree of modulation is operated in accordance with magnitude of an AC voltage found through current feedback control. For example, it has been known that a degree of modulation Kmd can be operated in accordance with the following equation (3), by using voltage command values Vd#, Vq# on the d-axis and the q-axis obtained through feedback control of a current on the d-axis and the q-axis.

$$Kmd = (Vd\#^2 + Vq\#^2)^{1/2}/VH \tag{3}$$

During application of PWM control, when degree of modulation Kmd is greater than 0.78, transition to a rectangular wave voltage control mode is indicated.

In rectangular wave voltage control, with decrease in output torque, current phase $\phi i$ varies to the right in FIG. 6 (toward the advance side). Then, as current phase $\phi i$ is smaller than reference value $\phi th$, that is, it enters a phase area on the retard side relative to mode switching line 43 shown in FIG. 6, transition to a PWM control mode is indicated.

As system voltage VH varies for the same output from AC motor M1, a degree of modulation in PWM control varies. In addition, in rectangular wave voltage control, with change in voltage phase $\phi v$ for obtaining that output, current phase $\phi i$ varies. Therefore, loss in the control system varies in accordance with system voltage VH.

FIG. 8 is a conceptual diagram for illustrating a behavior of the control system in accordance with variation in system voltage VH throughout three control modes. FIG. 8 shows a behavior at the time when system voltage VH is varied, while output (a rotation speed×torque) from AC motor M1 is the same.

Referring to FIG. 8, as system voltage VH is lowered for the same output, a degree of modulation increases. With increase in degree of modulation, sine wave PWM control, overmodulation PWM control, and rectangular wave voltage control are sequentially applied. In rectangular wave voltage control, a degree of modulation is constant at 0.78.

A current phase is controlled along optimal current phase line 42 (FIG. 6) as current feedback control is carried out, during application of PWM control. As system voltage VH is lowered, a motor current necessary for obtaining the same output increases, and hence a current phase gradually varies toward the advance side along optimal current phase line 42. In rectangular wave voltage control, a voltage phase for outputting the same torque increases as system voltage VH is lowered. Accordingly, as shown in FIG. 6, a current phase varies toward the advance side.

Motor loss is suppressed because a current phase is controlled along optimal current phase line 42 during application of PWM control. On the other hand, when rectangular wave voltage control is applied, motor loss increases under the influence of a field-weakening current. During application of rectangular wave voltage control, as system voltage VH lowers with respect to the same output, motor loss increases with increase in field-weakening current.

On the other hand, since inverter loss is dependent on the number of times of switching in inverter 14, it is suppressed during application of rectangular wave voltage control, whereas it increases during application of PWM control. As system voltage VH increases, electric power loss per one switching increases, and hence inverter loss increases.

It is understood from such characteristics of motor loss and inverter loss that a total of motor loss and inverter loss in the control system is minimized at operation point 44 at which rectangular wave voltage control is applied. As shown in FIG. 6, a current phase at operation point 44 is located on the advance side relative to optimal current phase line 42.

In the control system for the AC motor according to the present first embodiment, it is when rectangular wave voltage control is applied and a current phase of AC motor M1 corresponds to operation point 44 that loss in the overall control system is minimized. Namely, system voltage VH is preferably set such that such a state is established.

(Setting of System Voltage)

Figure 9:
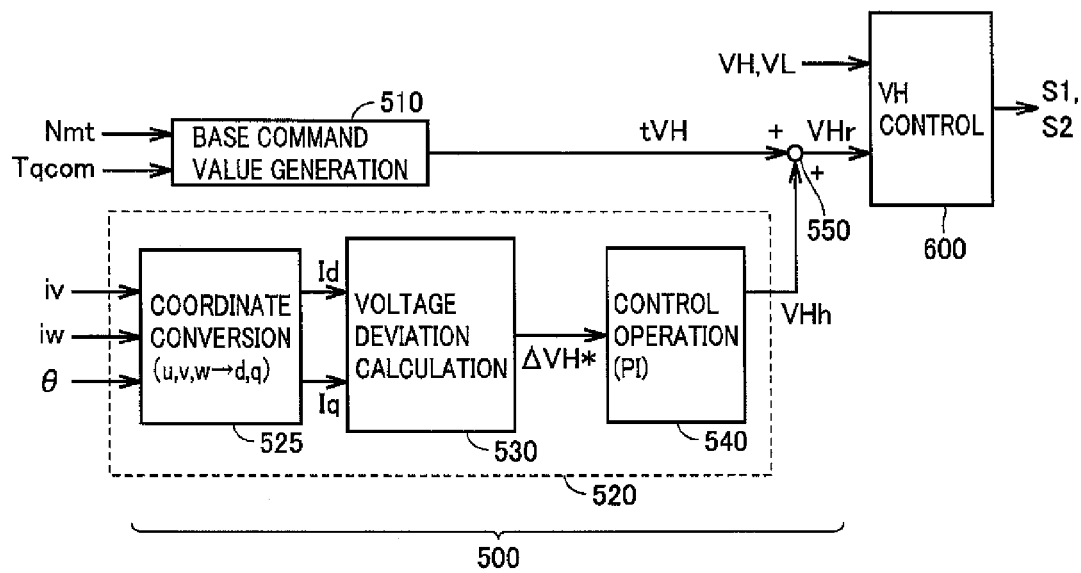
FIG. 9 is a functional block diagram showing a configuration for controlling a system voltage during rectangular wave voltage control in the control system for the AC motor according to the first embodiment of the present invention.

FIG. 9 is a functional block diagram showing a configuration for controlling a system voltage during rectangular wave voltage control in the control system for the AC motor according to the first embodiment of the present invention. A function of each functional block shown in functional block diagrams represented by FIG. 9 is implemented by software processing and/or hardware processing by control device 30.

Referring to FIG. 9, a VH command value setting portion 500 sets voltage command value VHr for system voltage VH. A VH control unit 600 generates switching control signals S1, S2 for boost converter 12 such that system voltage VH is controlled in accordance with voltage command value VHr.

VH command value setting portion 500 includes a base command value generation portion 510, a current phase control unit 520, and an operation portion 550. VH command value setting portion 500 corresponds to one embodiment of a "voltage command value setting portion."

Figure 10:
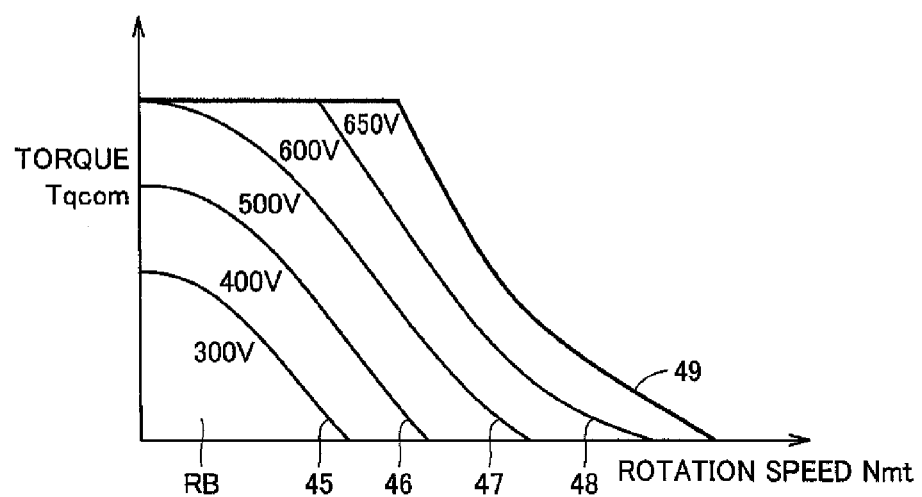
FIG. 10 is a conceptual diagram for illustrating one example of a map for a base command value generation portion shown in FIG. 9 to find a base command value.

Base command value generation portion 510 generates a base command value tVH for a voltage command value by referring to a map set in advance, based on rotation speed Nmt and torque command value Tqcom of AC motor M1. FIG. 10 shows one example of a map (a tVH map) for base command value generation portion 510 to find base command value tVH.

Referring to FIG. 10, the tVH map has the abscissa representing motor rotation speed Nmt and the ordinate representing torque command value Tqcom. In the present embodiment, an operation point in the map is partitioned by 4 lines 45 to 48 corresponding to system voltages VH=300 V, 400 V, 500 V, and 600 V, respectively. Then, a line 49 located outermost in the figure is a set of operation points corresponding to a maximum voltage (for example, 650 V) of system voltage VH.

A region RB substantially in a fan shape partitioned by line 45 at VH=300 V corresponds to an operation region in which boost converter 12 can drive AC motor M1 in a non-boost mode without boosting an output voltage from DC power supply B.

More specifically, a line is additionally provided for each prescribed voltage width (for example, 20 V) between lines 45 to 49. In the tVH map, base command value tVH can be set in accordance with a voltage value corresponding to a line in proximity to an operation point specified by torque command value Tqcom and rotation speed Nmt.

Referring again to FIG. 9, current phase control unit 520 has a coordinate conversion portion 525, a voltage deviation calculation portion 530, and a control operation portion 540.

Coordinate conversion portion 525 converts v-phase current iv and w-phase current iw detected by current sensor 24 as well as u-phase current iu (iu=−(iv+iw)) to d-axis current Id and q-axis current Iq, through coordinate conversion (three phases→two phases) using angle of rotation θ of AC motor M1 detected by rotation angle sensor 25.

Voltage deviation calculation portion 530 generates a voltage deviation ΔVH* in accordance with a current phase defined by d-axis current Id and q-axis current Iq on the d-q plane (FIG. 6). Voltage deviation calculation portion 530 calculates voltage deviation ΔVH* by using a voltage deviation map illustrated in FIG. 11.

Figure 11:
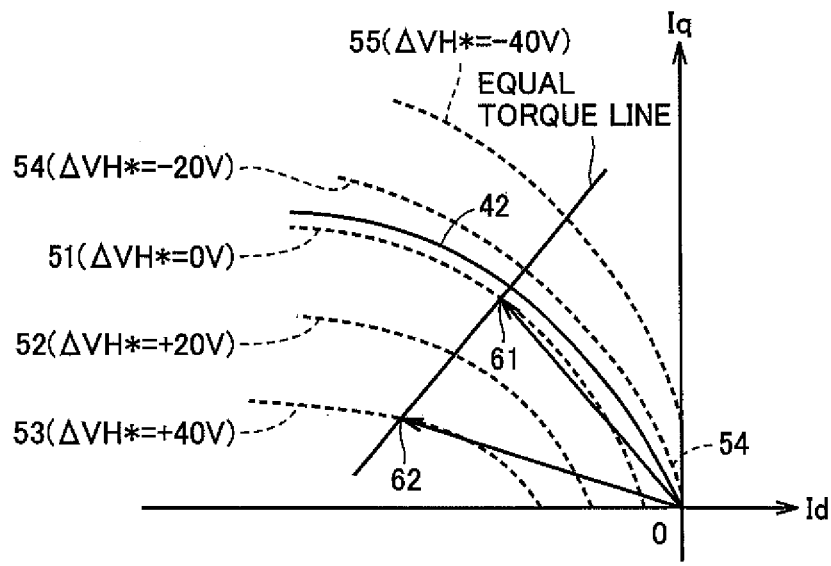
FIG. 11 is a conceptual diagram for illustrating one example of a map for a voltage deviation calculation portion shown in FIG. 9 to find voltage deviation.

FIG. 11 is a conceptual diagram for illustrating a configuration example of a voltage deviation map.

Referring to FIG. 11, a target current phase line 51 is drawn as a set of current phases corresponding to operation point 44 on each equal torque line on the d-q plane. Operation point 44 is set slightly on the advance side relative to optimal current phase line 42. Thus, the target current phase line during rectangular wave voltage control is set on the advance side relative to the target current phase line (that is, optimal current phase line 42) during PWM control. Target current phase line 51 can be set in advance based on actual machine tests or results of simulation, similarly to optimal current phase line 42 (FIG. 6).

A target current phase at present is shown by a point of intersection 61 between the equal torque line corresponding to current torque command value Tqcom and target current phase line 51. Therefore, in a case where a position of a tip end of a current phase vector is referred to by a numeral 61, the present current phase is located on target current phase line 51 and hence voltage deviation ΔVH*=0 is set so as to maintain current system voltage VH.

In contrast, in a case where the current phase at present is located on the advance side relative to target current phase line 51, voltage deviation ΔVH*>0 is set so as to raise current system voltage VH. In a region on the advance side, as a phase difference from target current phase line 51 is greater, voltage deviation ΔVH is also set to be great. FIG. 11 illustrates a phase line 52 which is a set of current phases at which ΔVH*=+20 V and a phase line 53 which is a set of current phases at which ΔVH*=+40 V.

As shown in FIG. 11, in a case where a position of a tip end of a current phase vector is referred to by a numeral 62, a current phase at present is located on phase line 53 and hence voltage deviation calculation portion 530 sets voltage deviation ΔVH*=+40 V from the voltage deviation map.

When the current phase at present is located on the retard side relative to target current phase line 51, voltage deviation ΔVH*<0 is set so as to lower current system voltage VH. In a region on the retard side as well, as a phase difference from target current phase line 51 is greater, an absolute value of voltage deviation (|ΔVH|) is set to be great. FIG. 11 illustrates a phase line 54 which is a set of current phases at which ΔVH*=−20 V and a phase line 55 which is a set of current phases at which ΔVH*=−40 V.

By subdivision of these phase lines or by using together linear interpolation, voltage deviation calculation portion 530 can calculate voltage deviation ΔVH* based on the voltage deviation map, in accordance with a current phase defined by d-axis current Id and q-axis current Iq.

Referring again to FIG. 9, control operation portion 540 calculates a VH correction value VHh through control operation based on voltage deviation ΔVH* generated by voltage deviation calculation portion 530. Control operation (PI operation) by control operation portion 540 is shown, for example, in the following equation (4):

$$VHh = Kp \cdot \Delta VH^* + Ki \cdot \Sigma(\Delta VH^*) \tag{4}$$

where Kp and Ki represent proportional gain and integration gain, respectively.

Operation portion 550 sets voltage command value VHr in accordance with the sum of base command value tVH from base command value generation portion 510 and VH correction value VHh from current phase control unit 520 (VHr=tVH+VHh). Thus, VH command value setting portion 500 modifies voltage command value VHr so as to bring a current phase of AC motor M1 closer to target current phase line 51 with base command value tVH serving as the reference.

VH control unit 600 generates switching control signals S1, S2 for boost converter 12 so as to obtain a duty ratio for controlling system voltage VH to voltage command value VHr. For example, a duty ratio can be set in accordance with a voltage ratio between DC voltage VL which is an input voltage to boost converter 12 and voltage command value VHr for an output voltage. In addition, a duty ratio can be subjected to feedback control in accordance with deviation between a detection value of system voltage VH and voltage command value VHr.

VH control unit 600 generates switching control signals S1, S2 through PWM control based on comparison of a voltage between a carrier wave having a duty ratio of 100% as amplitude and a desired duty ratio. Thus, switching elements Q1, Q2 are periodically turned on and off in accordance with a desired duty ratio, depending on a frequency of a carrier wave.

Figure 12:
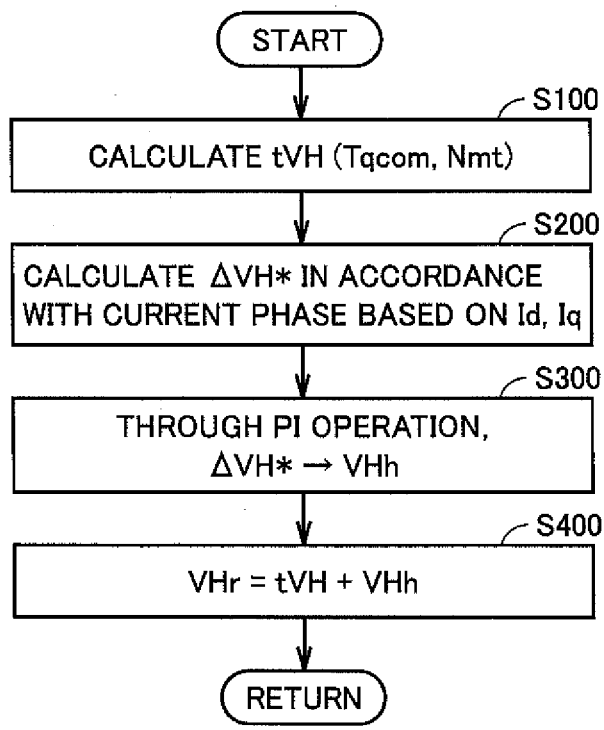
FIG. 12 is a flowchart for illustrating control processing involved with setting of a voltage command value for the system voltage according to the first embodiment.

FIG. 12 is a flowchart for illustrating control processing involved with setting of a voltage command value for the system voltage according to the first embodiment. The control processing shown in FIG. 12 is performed in a prescribed cycle by control device 30, so that a function of VH command value setting portion 500 shown in FIG. 9 is implemented.

Referring to FIG. 12, control device 30 calculates in step S100 base command value tVH for system voltage VH based on torque command value Tqcom and rotation speed Nmt of AC motor M1. Base command value tVH is calculated in step S100 by referring to the tVH map illustrated in FIG. 10.

Control device 30 calculates in step S200 voltage deviation ΔVH* in accordance with a current phase defined by d-axis current Id and q-axis current Iq. As described above, voltage deviation ΔVH* for bringing a current phase closer to target current phase line 51 can be calculated based on the voltage deviation map illustrated in FIG. 11.

In addition, control device 30 calculates in step S300 VH correction value VHh through control operation (PI operation) based on voltage deviation ΔVH* calculated in step S200. Moreover, control device 30 calculates in step S400 voltage command value VHr in accordance with the sum of base command value tVH calculated in step S100 and VH correction value VHh operated in step S300.

Through the processing in step S100, a function of base command value generation portion 510 in FIG. 9 is implemented, and through the processing in step S200, a function of voltage deviation calculation portion 530 in FIG. 9 is implemented. Similarly, through the processing in step S300, a function of control operation portion 540 in FIG. 9 is implemented, and through the processing in step S400, a function of operation portion 550 in FIG. 9 is implemented.

Thus, in the control system for the AC motor according to the present first embodiment, during rectangular wave voltage control, system voltage VH can be set such that a current phase (on the d-q plane) of AC motor M1 matches with target current phase line 51. In particular, by setting target current phase line 51 toward the advance side relative to optimal current phase line 42 shown in FIG. 6, correspondence with operation point 44 shown in FIG. 8 is achieved and system voltage VH can be set such that loss in the overall control system is minimized, although loss per se in AC motor M1 is not minimized.

Variation of First Embodiment

In a variation of the first embodiment, control for varying a target current phase line in accordance with a state of load of AC motor M1 will be described.

Figure 13:
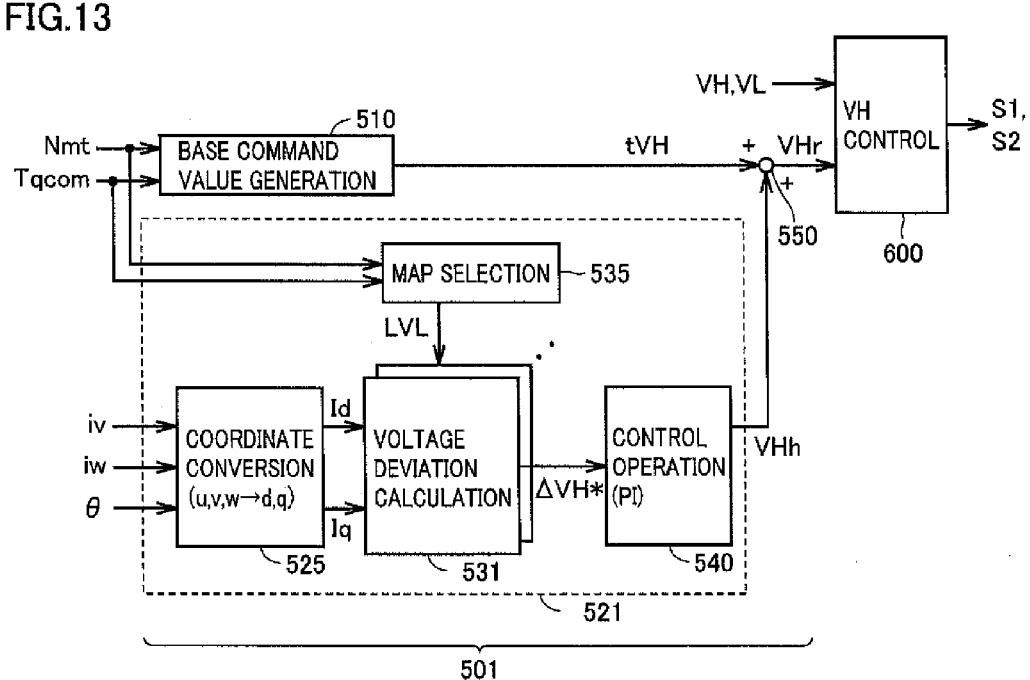
FIG. 13 is a functional block diagram showing a configuration for controlling a system voltage during rectangular wave voltage control in a control system for an AC motor according to a variation of the first embodiment of the invention.

FIG. 13 is a functional block diagram showing a configuration for controlling a system voltage during rectangular wave voltage control in a control system for an AC motor according to the variation of the first embodiment of the invention.

When FIG. 13 is compared with FIG. 9, in the configuration according to the variation of the first embodiment, a VH command value setting portion 501 is provided instead of VH command value setting portion 500. VH command value setting portion 501 includes base command value generation portion 510 and operation portion 550 similar to those in FIG. 11 and a current phase control unit 521 provided instead of current phase control unit 520.

Current phase control unit 521 includes coordinate conversion portion 525, a voltage deviation calculation portion 531, a map selection portion 535, and control operation portion 540.

In the variation of the first embodiment, a plurality of voltage deviation maps are prepared. Then, map selection portion 535 switches a voltage deviation map in accordance with a state of load, representatively a load factor, of AC motor M1.

A load factor Lfc of AC motor M1 is shown in the following equation (5):

$$Lfc = Pm/Pmax = (Tqcom \cdot Mmt)/Pmax \tag{5}$$

where Pm represents output electric power from AC motor M1 and Pmax represents maximum output electric power rating of AC motor M1. Namely, load factor Lfc corresponds to a ratio of output electric power in accordance with torque command value Tqcom to maximum output electric power.

Figure 14:
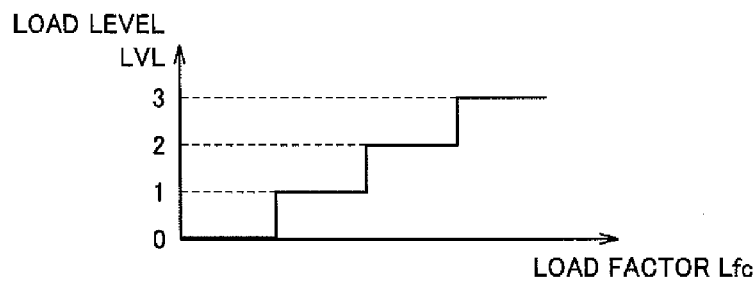
FIG. 14 is a conceptual diagram for illustrating setting of a load level in accordance with a load factor of an AC motor.

Referring to FIG. 14, map selection portion 535 sets a load level of AC motor M1 based on load factor Lfc.

In the example in FIG. 14, load levels LVL are set in four stages from 0 to 3 based on load factor Lfc. As output electric power from AC motor M1 is lower, LVL is set to a lower stage and as output electric power is higher, LVL is set to a higher stage.

Figure 15:
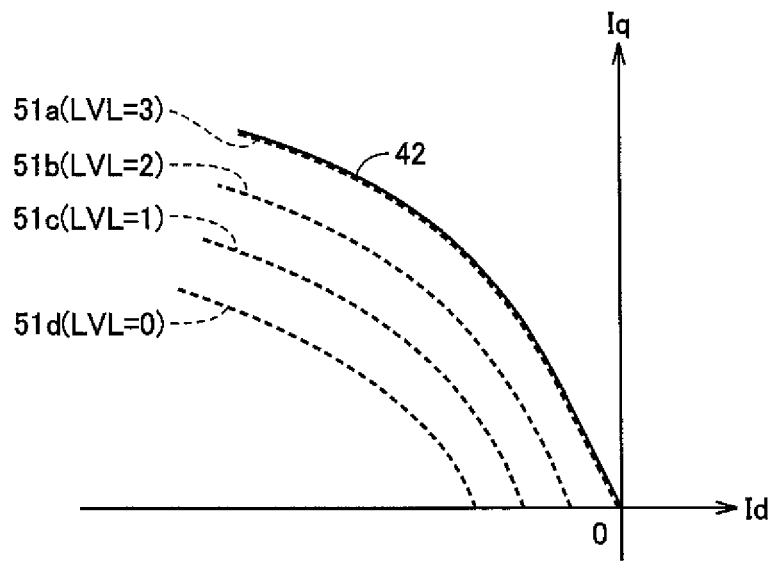
FIG. 15 is a conceptual diagram for illustrating setting of a target current phase in accordance with a load level of the AC motor.

In the variation of the first embodiment, as shown in FIG. 15, a target current phase line is switched in accordance with load level LVL of AC motor M1.

Referring to FIG. 15, a plurality of target current phase lines 51 are set in correspondence with respective load levels LVL. FIG. 15 shows a target current phase line 51a selected at the time when LVL=3, a target current phase line 51b selected at the time when LVL=2, a target current phase line 51c selected at the time when LVL=1, and a target current phase line 51d selected at the time when LVL=0.

As the load level is lower, that is, output electric power from AC motor M1 is lower, the target current phase line is set to be away from optimal current phase line 42 toward the advance side. On the other hand, when the load level is highest (LVL=3), target current phase line 51a is set on the advance side in proximity to optimal current phase line 42.

Motor loss is mainly copper loss in proportion to a square of a motor current. On the other hand, since loss in the inverter is mainly switching loss, it is dependent on a product of system voltage VH and a current which flows through the inverter.

In a high-load state of AC motor M1, since a motor current is high, copper loss in AC motor M1 increases. Therefore, motor loss is more dominant than switching loss in inverter 14. Therefore, in the high-load state, control of a current phase of AC motor M1 in the vicinity of optimal current phase line 42 for minimizing motor loss is effective for lowering loss in the overall control system.

On the other hand, in a low-load state of AC motor M1, since a motor current is low, inverter loss is more dominant than motor loss. Therefore, in the low-load state, lowering inverter loss by lowering system voltage VH is preferred. Namely, with regard to a current phase, aiming at a more advanced side than in the high-load state is effective for lowering loss in the overall control system.

If a current phase is excessively advanced as shown in FIG. 8, motor loss increases due to increase in field-weakening current. Therefore, in consideration of balance between lowering in inverter loss and increase in motor loss, an amount of retard of target current phase line 51 relative to optimal current phase line 42 at each load level should appropriately be set such that loss in the overall control system is minimized. Each of target current phase lines 51a to 51d can be set in advance based on actual machine tests or results of simulation, similarly to target current phase line. 51 (FIG. 11).

Referring again to FIG. 13, voltage deviation calculation portion 531 selects one of the plurality of voltage deviation maps in accordance with load level LVL set by map selection portion 535. The plurality of voltage deviation maps are prepared in advance in correspondence with target current phase lines 51a to 51d, respectively.

Figure 16:
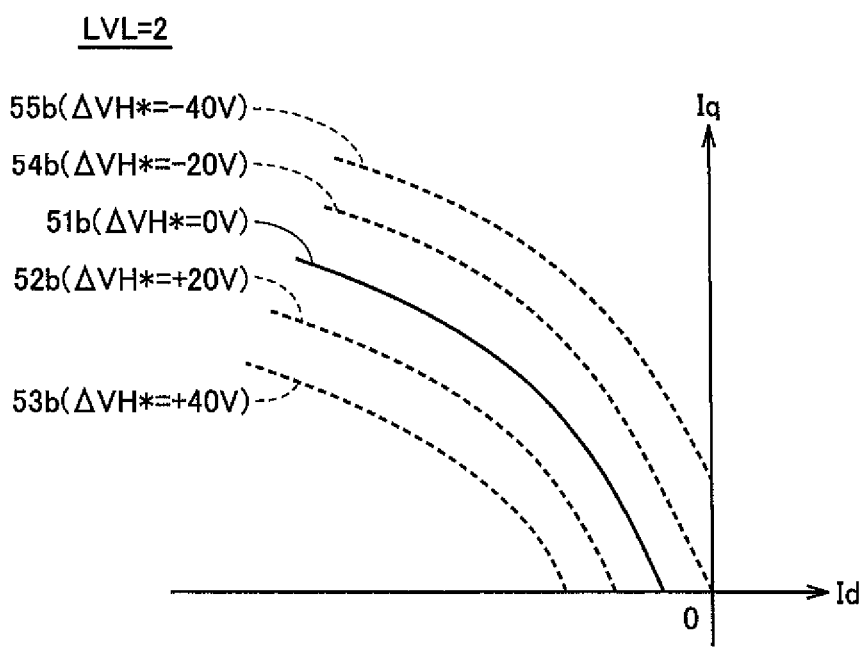
FIG. 16 is a first conceptual diagram for illustrating one example of a voltage deviation map according to the variation of the first embodiment.
Figure 17:
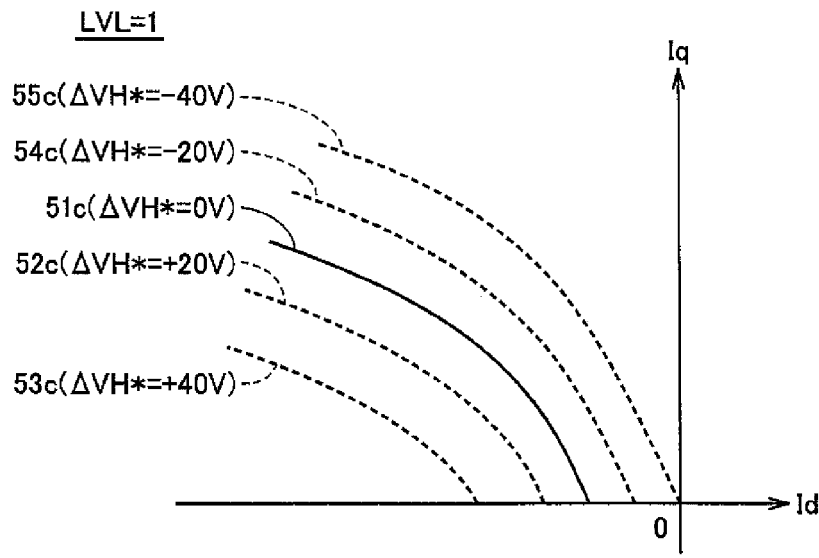
FIG. 17 is a second conceptual diagram for illustrating one example of a voltage deviation map according to the variation of the first embodiment.

FIGS. 16 and 17 show configuration examples of a voltage deviation map according to the variation of the first embodiment. FIG. 16 shows an example of a voltage deviation map at the time of load level LVL=2, and FIG. 17 shows an example of a voltage deviation map at the time of load level LVL=1.

Referring to FIG. 16, phase lines 52b to 55b for target current phase line 51b ($\Delta VH^*=0$) at the time of LVL=2 are exemplified. Phase line 52b is predetermined as a set of current phases at which $\Delta VH^*=+20$ V, and phase line 53b is predetermined as a set of current phases at which $\Delta VH^*=+40$ V. Similarly, phase line 54b is predetermined as a set of current phases at which $\Delta VH^*=-20$ V, and phase line 55b is predetermined as a set of current phases at which $\Delta VH^*=-40$ V.

Referring to FIG. 17, phase lines 52c to 55c for target current phase line 51c ($\Delta VH^*=0$) at the time of LVL=1 are exemplified. Phase line 52c is predetermined as a set of current phases at which $\Delta VH^*=+20$ V, and phase line 53c is predetermined as a set of current phases at which $\Delta VH^*=+40$ V. Similarly, phase line 54c is predetermined as a set of current phases at which $\Delta VH^*=-20$ V, and phase line 55c is predetermined as a set of current phases at which $\Delta VH^*=-40$ V.

As understood from FIGS. 16 and 17, voltage deviation $\Delta VH^*>0$ is set when a current phase is on the advance side relative to the target current phase line for each of target current phase lines 51b, 51c variably set in accordance with load level LVL, whereas voltage deviation $\Delta VH^*<0$ is set when a current phase is on the retard side relative to the target current phase line. In addition, phase lines 52c to 55c are set on the advance side as compared with phase lines 52b to 55b. Therefore, as the load level is lower, voltage deviation $\Delta VH^*$ lowers for the same current phase.

Referring again to FIG. 13, voltage deviation calculation portion 531 calculates voltage deviation $\Delta VH^*$ in accordance with a current phase (the d-q plane) defined by d-axis current Id and q-axis current Iq from coordinate conversion portion 525 similarly to voltage deviation calculation portion 530, by using a voltage deviation map selected in accordance with load level LVL.

Since the functions of base command value generation portion 510, control operation portion 540, operation portion 550, and VH control unit 600 are the same as in the first embodiment, detailed description will not be repeated.

Figure 18:
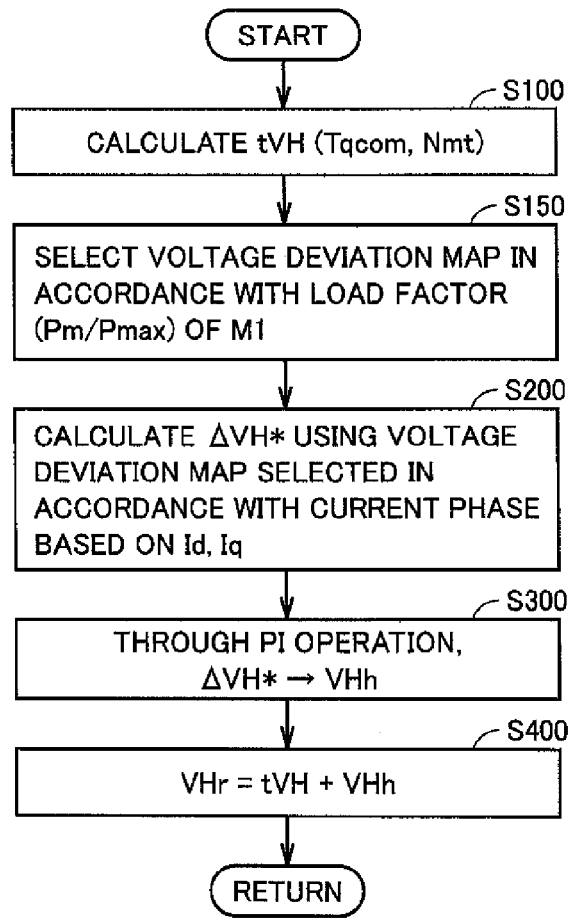
FIG. 18 is a flowchart for illustrating control processing involved with setting of a voltage command value for a system voltage according to the variation of the first embodiment.

FIG. 18 is a flowchart for illustrating control processing involved with setting of voltage command value VHr for a system voltage in the control system for the AC motor according to the variation of the first embodiment. As the control processing shown in FIG. 18 is performed in a prescribed cycle by control device 30, a function of VH command value setting portion 501 shown in FIG. 13 is implemented.

Referring to FIG. 18, control device 30 calculates base command value tVH for system voltage VH in step S100 similar to that in FIG. 12. In addition, control device 30 makes selection in step S150 from among target current phase lines 51a to 51d in accordance with a state of load (load factor Pm/Pmax) of AC motor M1 and selects a voltage deviation map corresponding to the selected target current phase line. Thus, the target current phase line varies in accordance with a state of load of AC motor M1.

In addition, control device 30 calculates in step S200 voltage deviation $\Delta VH^*$ in accordance with a current phase defined by d-axis current Id and q-axis current Iq, by using the voltage deviation map selected in step S150. Thus, voltage deviation $\Delta VH^*$ is calculated in accordance with a difference between the target current phase line variably set in accordance with a state of load of AC motor M1 and the present current phase.

Control device 30 calculates in steps S300, S400 similar to those in FIG. 12 voltage command value VHr based on voltage deviation $\Delta VH^*$ calculated in step S200.

Through the processing in step S150, a function of map selection portion 535 in FIG. 13 is implemented, Similarly, through the processing in step S200 in accordance with map selection in step S150, a function of voltage deviation calculation portion 531 in FIG. 13 is implemented.

Thus, in the control system for the AC motor according to the variation of the present first embodiment, by variably setting a target current phase on the d-q plane in accordance with a state of load of AC motor M1, system voltage VH can be set so as to lower loss in the overall control system, following change in state of load of AC motor M1.

Second Embodiment

In a second embodiment, application to a configuration in which a plurality of inverters common in a DC link voltage control a plurality of AC motors, respectively, will be described. As described above, a control target of a control system according to the present invention is representatively a motor for running of an electrically-powered vehicle.

Therefore, in the second embodiment, a configuration in a case where a hybrid vehicle shown as a representative example of an electrically-powered vehicle incorporates a plurality of AC motors will be described.

Figure 19:
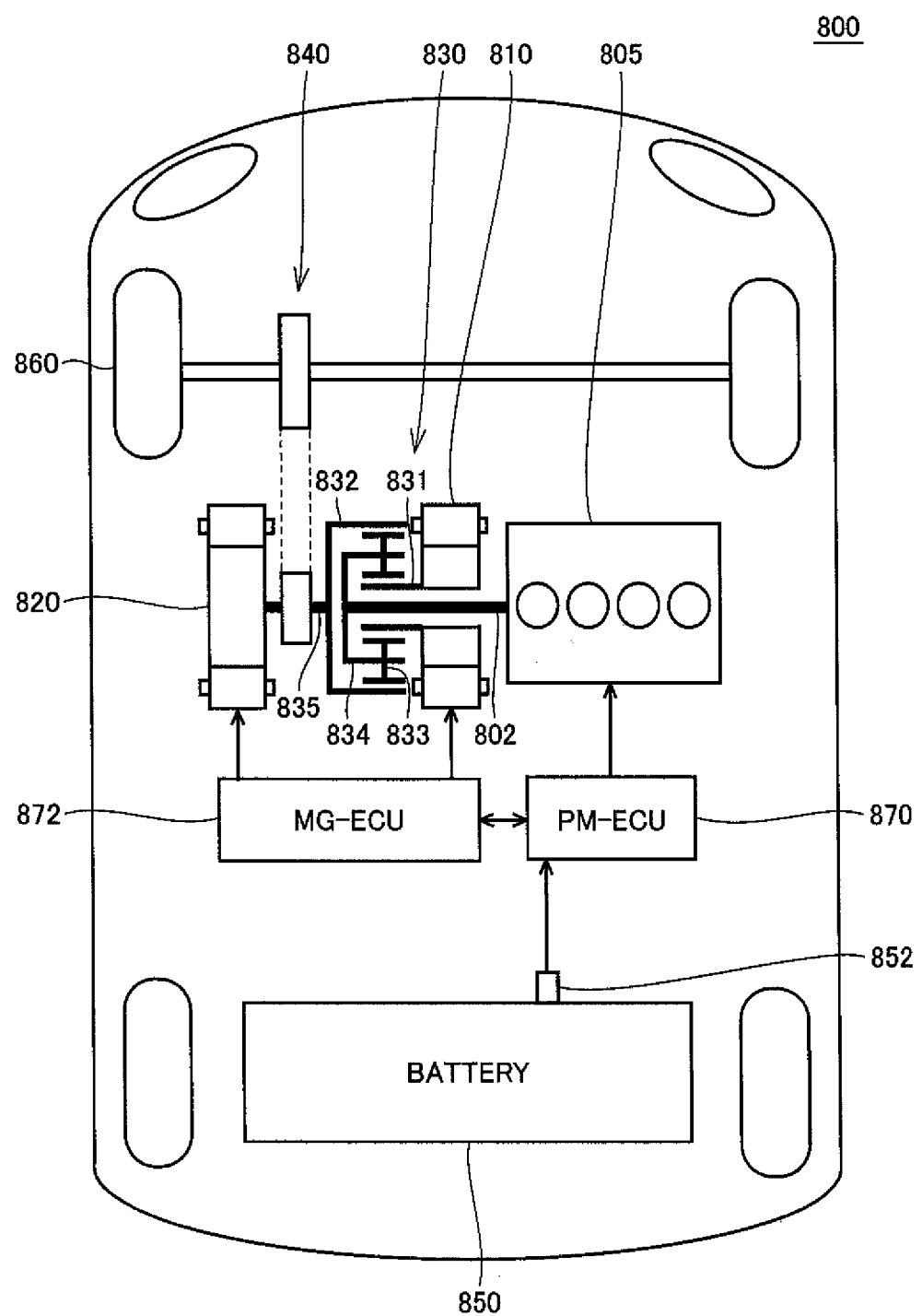
FIG. 19 is a schematic block diagram showing a configuration example of a hybrid vehicle shown as a representative example of an electrically-powered vehicle incorporating a control system for an AC motor according to a second embodiment of the present invention.

FIG. 19 is a schematic block diagram showing a configuration example of a hybrid vehicle shown as a representative example of an electrically-powered vehicle incorporating a control system for an AC motor according to the second embodiment of the present invention.

Referring to FIG. 19, a hybrid vehicle 800 includes an engine 805, a first MG (Motor Generator) 810 (hereinafter also referred to as "MG1"), a second MG 820 (hereinafter also referred to as "MG2"), a power split device 830, a reduction gear 840, a battery 850, a drive wheel 860, a PM (Power train Manager)-ECU (Electronic Control Unit) 870, and an MG (Motor Generator)-ECU 872.

Hybrid vehicle 800 runs with driving force from at least any one of engine 805 and MG2. Engine 805, MG1, and MG2 are connected with power split device 830 being interposed.

Power split device 830 is representatively constituted as a planetary gear mechanism. Power split device 830 includes a sun gear 831 having an external gear, a ring gear 832 having an internal gear and arranged concentrically with this sun gear 831, a plurality of pinion gears 833 engaged with sun gear 831 and engaged also with ring gear 832, and a carrier 834. Carrier 834 is constructed to rotatably and revolvably hold the plurality of pinion gears 833.

Sun gear 831 is connected to an output shaft of MG1. Ring gear 832 is rotatably supported concentrically with a crankshaft 802. Pinion gear 833 is arranged between sun gear 831 and ring gear 832, and it revolves around sun gear 831 while it is rotating. Carrier 834 is coupled to an end portion of crankshaft 802 and supports a rotation shaft of each pinion gear 833.

Sun gear 831 and a ring gear shaft 835 rotate with rotation of ring gear 832. An output shaft of MG2 is connected to ring gear shaft 835. Ring gear shaft 835 is also referred to as a drive shaft 835 hereinafter.

It is noted that the output shaft of MG2 may be constructed to be connected to drive shaft 835 with a transmission being interposed. Since a construction in which no transmission is arranged is illustrated in the present embodiment, a rotation speed ratio between MG2 and ring gear (drive shaft) 835 is 1:1. In a configuration where a transmission is arranged, however, a ratio of a rotation speed and torque between drive shaft 835 and MG2 is determined by a transmission gear ratio.

Drive shaft 835 is mechanically connected to drive wheel 860 with reduction gear 840 being interposed. Therefore, motive power output through power split device 830 to ring gear 832, that is, drive shaft 835, is output to drive wheel 860 through reduction gear 840. Though a front wheel is adopted as drive wheel 860 in the example in FIG. 19, a rear wheel may be adopted as drive wheel 860 or the front wheel and the rear wheel may be adopted as drive wheels 860.

Power split device 830 performs a differential action with sun gear 831, ring gear 832, and carrier 834 serving as rotation elements. These three rotation elements are mechanically connected to three shafts of crankshaft 802 of engine 805, the output shaft of MG1, and drive shaft 835.

Motive power generated by engine 805 is split by power split device 830 into two paths. One is a path for driving drive wheel 860 through reduction gear 840. The other is a path for driving MG1 to generate electric power. Power split device 830 distributes motive power from engine 805 input from carrier 834 to a side of sun gear 831 and a side of ring gear 832 in accordance with a gear ratio, when MG1 functions as a generator. On the other hand, when MG1 functions as a motor, power split device 830 integrates motive power from engine 805 input from carrier 834 and motive power from MG1 input from sun gear 831 and outputs resultant motive power to ring gear 832.

MG1 and MG2 are each representatively a three-phase AC rotating electric machine implemented by a permanent magnet motor.

MG1 can mainly operate as a generator and generate electric power with driving force from engine 805 split by power split device 830, Electric power generated by MG1 is selectively used in accordance with a state of running of a vehicle and an SOC (State Of Charge) of battery 850. For example, during normal running, electric power generated by MG1 serves as electric power for driving MG2 as it is. On the other hand, when SOC of battery 850 is lower than a predetermined value, electric power generated by MG1 is converted from AC to DC by an inverter which will be described later. Thereafter, a voltage is regulated by a converter which will be described later, for storage in battery 850. It is noted that MG1 can also operate as a motor as a result of torque control, in a case where engine 805 is motored at the time of start of the engine, or the like.

MG2 mainly operates as a motor and it is driven with at least any electric power of electric power stored in battery 850 and electric power generated by MG1. Motive power generated by MG2 is transmitted to drive shaft 835 and further transmitted to drive wheel 860 through reduction gear 840. Thus, MG2 assists engine 805 or runs the vehicle with driving force from MG2.

During regenerative braking of a hybrid vehicle, MG2 is driven by drive wheel 860 through reduction gear 840. In this case, MG2 operates as a generator. Thus, MG2 functions as a regenerative brake converting braking energy to electric power. Electric power generated by MG2 is stored in battery 850.

Battery 850 is a battery assembly constituted by connecting in series a plurality of battery modules in which a plurality of battery cells are integrated. A voltage of battery 850 is, for example, around 200 V. Battery 850 can be charged with electric power generated by MG1 or MG2. A temperature, a voltage, and a current of battery 850 are detected by a battery sensor 852. Battery sensor 852 is a comprehensive denotation of a temperature sensor, a voltage sensor, and a current sensor.

Charging electric power to battery 850 is restricted not to exceed an upper limit value WIN. Similarly, discharging electric power from battery 850 is restricted not to exceed an upper limit value WOUT. Upper limit values WIN, WOUT are determined based on various parameters such as SOC, a temperature, and a rate of change in temperature of battery 850.

PM-ECU 870 and MG-ECU 872 are configured to embed a CPU (Central Processing Unit) and a memory which are not shown, and configured to perform operation processing based on a detection value from each sensor through software processing in accordance with a map and a program stored in the memory. Alternatively, at least a part of the ECU may be configured to perform prescribed numeric value operation processing and/or logical operation processing through hardware processing with the use of dedicated electronic circuitry or the like.

Engine 805 is controlled in accordance with a control target value from PM-ECU 870. MG1 and MG2 are controlled by MG-ECU 872. PM-ECU 870 and MG-ECU 872 are connected to be able to communicate bidirectionally. PM-ECU 870 generates control target values for engine 805, MG1, and MG2 (representatively, a torque target value) through running control which will be described later.

Then, MG-ECU 872 controls MG1 and MG2 in accordance with the control target value transmitted from PM-ECU 870. It is noted that engine 805 controls an amount of fuel injection, ignition timing, or the like in accordance with an operation target value (representatively, a torque target value and a rotation speed target value) from PM-ECU 870.

Figure 20:
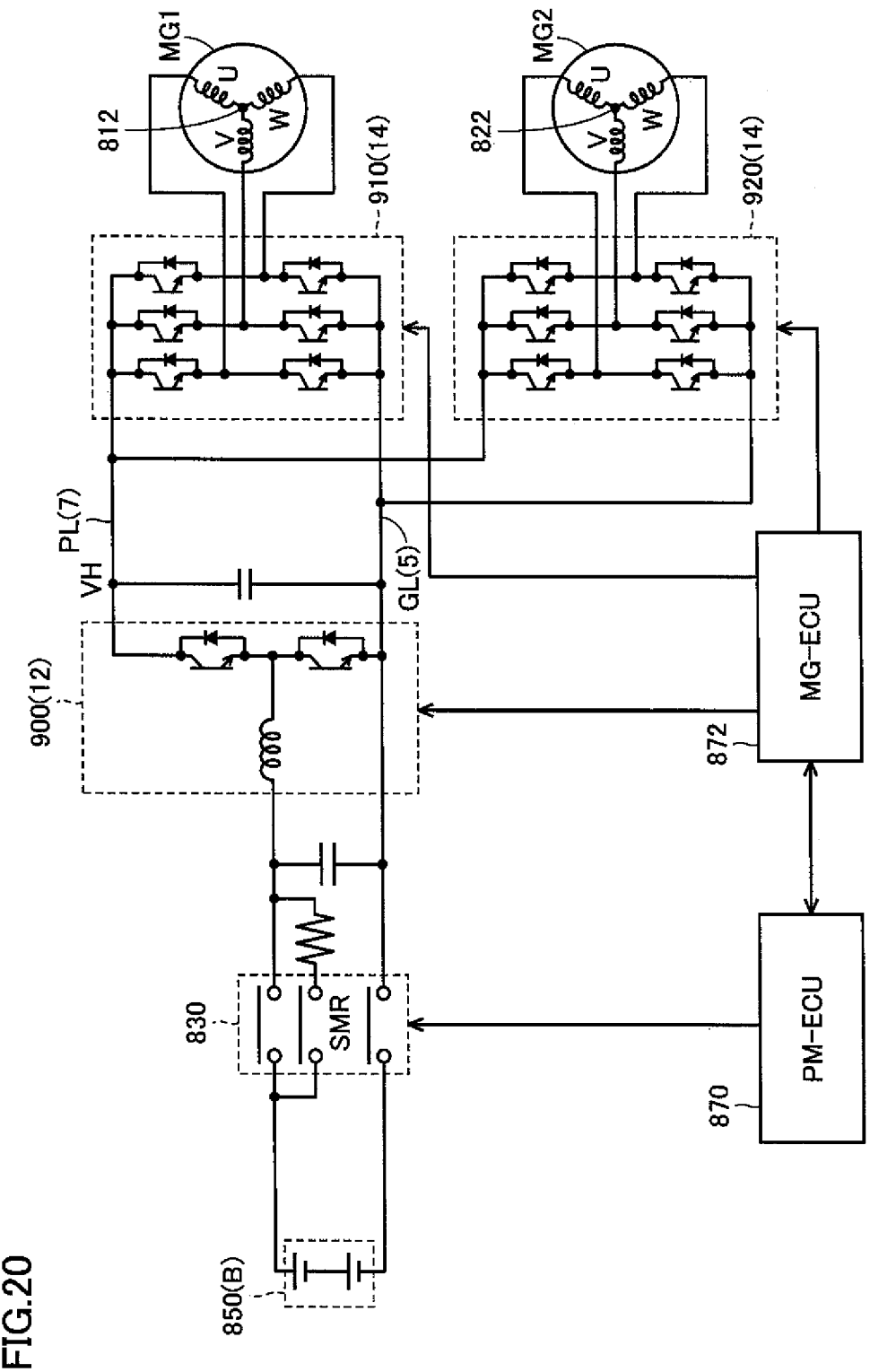
FIG. 20 is a circuit diagram illustrating a configuration example of the control system for the AC motor mounted on the hybrid vehicle shown in FIG. 19.

FIG. 20 is a circuit diagram illustrating a configuration example of the control system for the AC motor mounted on the hybrid vehicle shown in FIG. 19.

Referring to FIG. 20, an electric system of a hybrid vehicle is provided with an SMR 830, a converter 900, an inverter 910 corresponding to MG1, and an inverter 920 corresponding to MG2.

The control system for the AC motor shown in FIG. 20 is an expanded version of the control system for the AC motor shown in FIG. 1 such that two AC motors MG1, MG2 are controlled. Battery 850 corresponds to DC power supply B in FIG. 1 and SMR 830 corresponds to system relays SR1, SR2 in FIG. 1. Converter 900 is configured similarly to boost converter 12 in FIG. 1 and controls DC voltage VH (system voltage VH) on a power line PL in accordance with voltage command value VHr.

Each of inverters 910 and 920 is configured similarly to inverter 14 in FIG. 1, DC sides of inverters 910 and 920 are connected to common power lines PL and GL. Power lines PL and GL correspond to power lines 7 and 5 in FIG. 1, respectively. Therefore, inverters 910 and 920 convert common system voltage VH to an AC voltage and supply the resultant AC voltage to MG1 and MG2, respectively.

MG1 has a U-phase coil, a V-phase coil, and a W-phase coil which are star-connected, as stator windings. One ends of the coils of respective phases are connected to one another at a neutral point 812. The other ends of the coils of respective phases are connected to points of connection of switching elements in arms of respective phases of inverter 910. Similarly to MG1, MG2 has a U-phase coil, a V-phase coil, and a W-phase coil which are star-connected, as stator windings. One ends of the coils of respective phases are connected to one another at a neutral point 822. The other ends of the coils of respective phases are connected to points of connection of switching elements in arms of respective phases of inverter 920.

MG-ECU 872 corresponds to control device 30 in FIG. 1. PM-ECU 870 generates torque command values Tqcom(1) and Tqcom(2) for MG1 and MG2, as a part of control of an operation of overall hybrid vehicle 800. MG-ECU 872 controls inverters 910, 920 such that output torque from MG1 and MG2 attains to torque command values Tqcom(1) and Tqcom(2). Each of MG1 control and MG2 control by inverters 910 and 920 is carried out similarly to control of AC motor M1 by inverter 14.

In addition, PM-ECU 870 sets a command value for system voltage VH in accordance with a state of operation of MG1, MG2, and controls converter 900 such that system voltage VH attains to voltage command value VHr.

Figure 21:
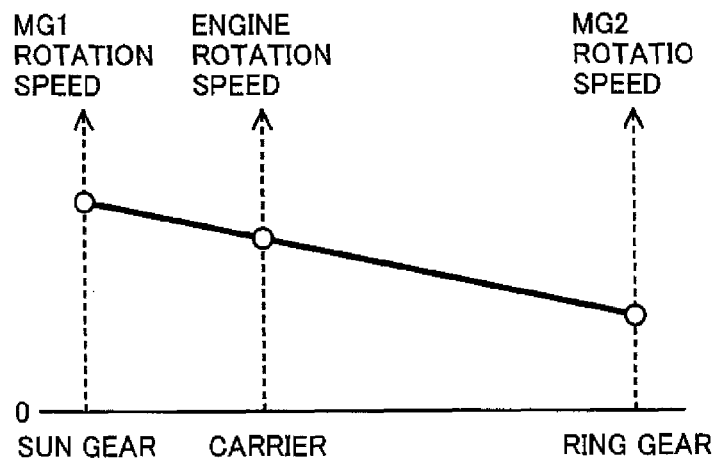
FIG. 21 is a nomographic chart showing relation between rotation speeds of an engine, an MG1, and an MG2 in the hybrid vehicle shown in FIG. 19.

In hybrid vehicle 800, engine 805, MG1, and MG2 are connected to one another with a planetary gear being interposed. Therefore, rotation speeds of engine 805, MG1, and MG2 establish relation connected with a straight line in a nomographic chart as shown in FIG. 21.

In hybrid vehicle 800, running control for carrying out running suited to a state of the vehicle is carried out by PM-ECU 870. For example, at the time of start of the vehicle and during running at low speed, the hybrid vehicle runs with output from MG2 while engine 805 remains stopped. Here, the rotation speed of MG2 is positive and the rotation speed of MG1 is negative.

During steady running, in order to crank engine 805 with the use of MG1, MG1 is actuated as a motor and the rotation speed of MG1 is set to positive. In this case, MG1 operates as a motor. Then, engine 805 is started and the hybrid vehicle runs with output from engine 805 and MG2. Thus, fuel efficiency of hybrid vehicle 800 improves by operating engine 805 at an operation point of high efficiency.

In the control system according to the second embodiment, output torque from MG1 and MG2 is controlled by inverters 910, 920 in accordance with torque command values Tqcom(1) and Tqcom(2). Each of inverters 910, 920 is controlled similarly to inverter 14 in the first embodiment.

In the control system according to the second embodiment, since system voltage VH is common between MG1 and MG2, how to set the system voltage becomes an issue.

Figure 22A:
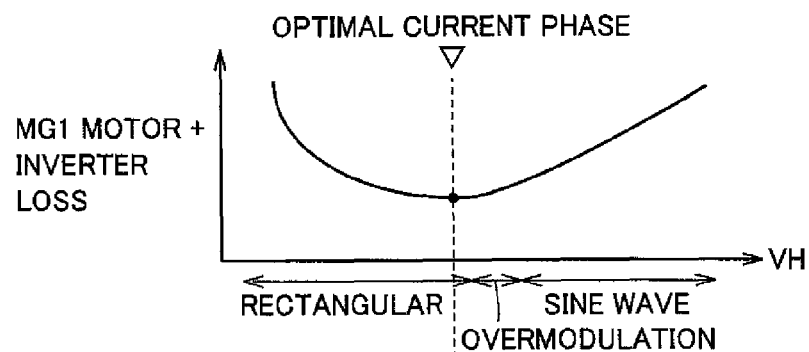
FIGS. 22A to 22C are conceptual diagrams illustrating setting of a system voltage for minimizing total loss in MG1 and MG2.
Figure 22B:
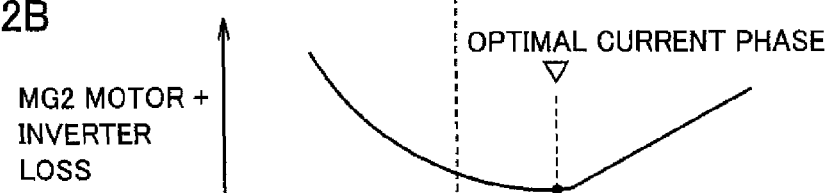
Figure 22C:
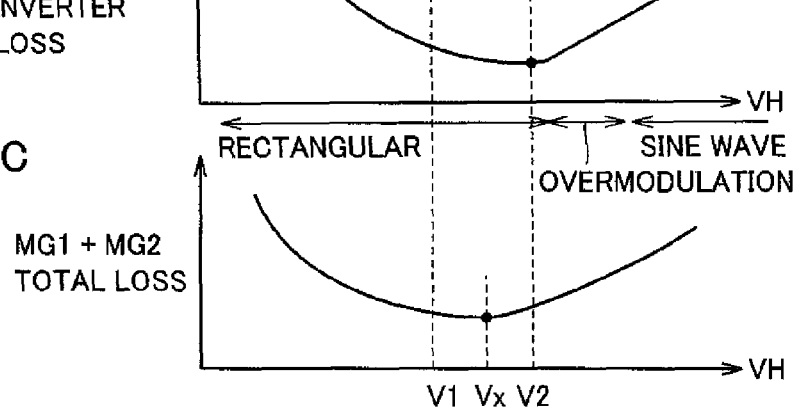

FIGS. 22A to 22C are conceptual diagrams illustrating setting of system voltage VH for minimizing total loss in MG1 and MG2 representing a plurality of AC motors.

Referring to FIG. 22A, with regard to MG1, it is assumed that the sum of loss in MG1 and inverter 910 is minimized when VH=V1. Here, MG1 operates at operation point 44 shown in FIGS. 6 and 8. Similarly, as shown in FIG. 22B, with regard to MG2, it is assumed that the sum of loss in MG2 and inverter 920 is minimized when VH=V2 (V2>V1). Here, MG2 operates at operation point 44 shown in FIGS. 6 and 8.

Therefore, as shown in FIG. 22C, total loss in the control system in connection with MG2 and MG1 is minimized when system voltage VH attains to Vx between an optimal voltage V1 for MG1 and an optimal voltage V2 for MG2. Therefore, as in PTD 2, it is difficult to sufficiently lower total loss in the control system, with such control that optimal voltages V1, V2 at which the sum of motor loss and inverter loss is minimized are found for MG1 and MG2 respectively and a system voltage is set in accordance with a maximum value thereof.

Figure 23:
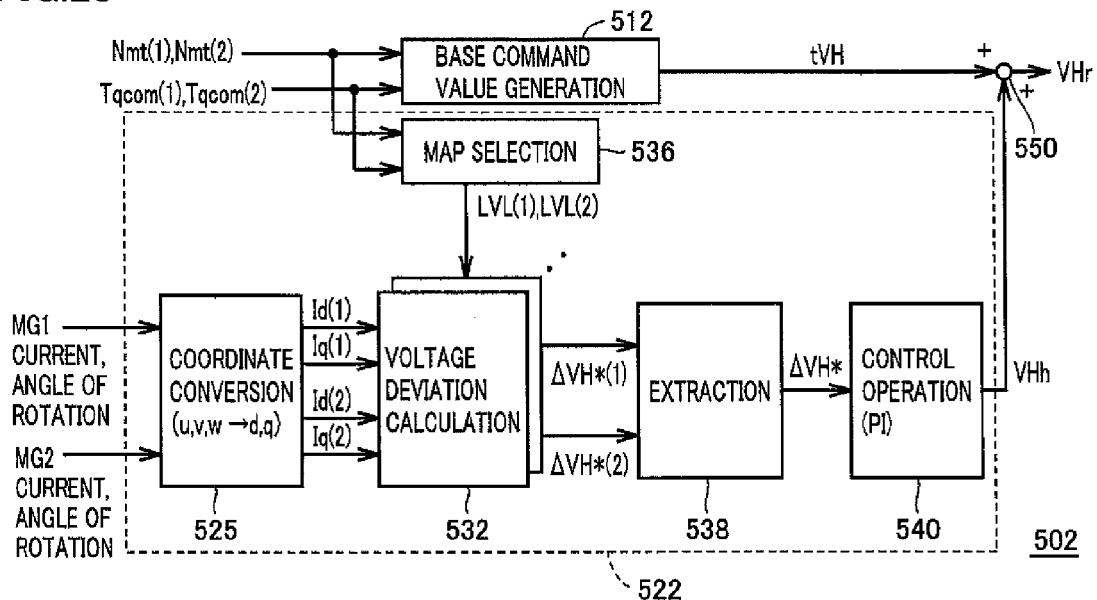
FIG. 23 is a functional block diagram involved with setting of a voltage command value for a system voltage in the control system for the AC motor according to the second embodiment of the invention.

FIG. 23 is a functional block diagram involved with setting of a voltage command value for a system voltage in the control system for the AC motor according to the second embodiment of the invention.

When FIG. 23 is compared with FIG. 9, in the second embodiment, a VH command value setting portion 502 provided instead of VH command value setting portion 500 generates voltage command value VHr. VH command value setting portion 502 includes a base command value generation portion 512 provided instead of base command value generation portion 510, a current phase control unit 522 provided instead of current phase control unit 520, and operation portion 550 the same as in FIG. 9.

Base command value generation portion 512 generates base command value tVH based on a rotation speed Nmt(1) and torque command value Tqcom(1) of MG1 and a rotation speed Nmt(2) and torque command value Tqcom(2) of MG2. Base command value generation portion 512 uses the tVH map in FIG. 10 and finds tVH(1) based on rotation speed Nmt(1) and torque command value Tqcom(1) and tVH(2) based on rotation speed Nmt(2) and torque command value Tqcom(2), similarly to base command value generation portion 510. In addition, base command value generation portion 512 sets as base command value tVH, a maximum value of tVH(1) corresponding to a state of operation of MG1 and tVH(2) corresponding to a state of operation of MG2.

Current phase control unit 522 has coordinate conversion portion 525, a voltage deviation calculation portion 532, a map selection portion 536, an extraction portion 538, and control operation portion 540.

Map selection portion 536 sets load levels LVL(1) and LVL(2) based on load factors Lfc(1) and Lfc(2), for each of MG1 and MG2:

Load factors Lfc(1) and Lfc(2) of MG1 and MG2 are calculated in accordance with the following equations (6), (7):

$$Lfc(1) = Pm(1)/P\max(1) \quad (6)$$
$$= Tqcom(1) \cdot Nmt(1)/P\max(1)$$

$$Lfc(2) = Pm(2)/P\max(2) \quad (7)$$
$$= Tqcom(2) \cdot Nmt(2)/P\max(2)$$

where Pm(1) and Pm(2) represent output electric power from MG1 and MG2, respectively, and Pmax(1) and Pmax(2) represent maximum output electric power ratings of MG1 and MG2, respectively. Namely, load factors Lfc(1), Lfc(2) correspond to load factor Lfc in MG1, MG2.

Map selection portion 536 sets load levels LVL(1), LVL(2) of MG1 and MG2, in accordance with load ratios Lmgf(1), Lmgf(2) which are relative ratios between load factors Lfc(1) and Lfc(2), defined by equations (8), (9).

$$Lmgf(1) = Lfc(1)/Lfc(2) \quad (8)$$

$$Lmgf(2) = Lfc(2)/Lfc(1) \quad (9)$$

Map selection portion 536 sets load level LVL(1) based on load ratio Lmgf(1) of MG1 and sets load level LVL(2) based on load ratio Lmgf(2) of MG2.

Figure 24:
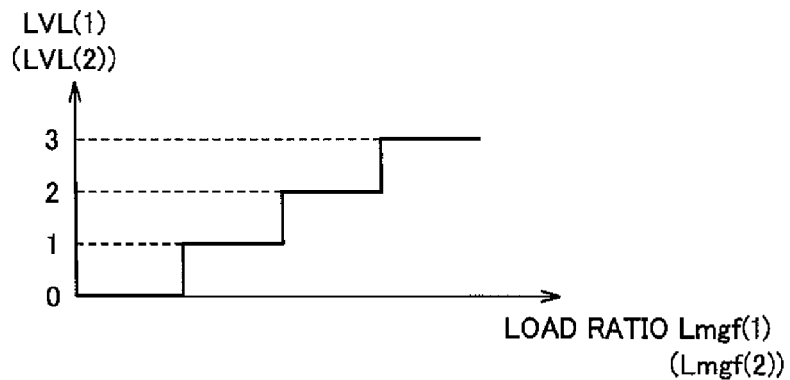
FIG. 24 is a conceptual diagram for illustrating setting of a load level of MG1, MG2 in accordance with a load ratio between MG1, MG2.

As illustrated in FIG. 24, load level LVL(1) is set in four stages from 0 to 3, in accordance with load ratio Lmgf(1). Similarly, load level LVL(2) is set in four stages from 0 to 3, in accordance with load ratio Lmgf(2).

Load level LVL is set to be high in an MG relatively high in load, in accordance with load ratios Lmgf(1), Lmgf(2) of MG1, MG2.

Coordinate conversion portion 525 calculates a d-axis current Id(1) and a q-axis current Iq(1) of MG1 based on a motor current (a three-phase current) and an angle of rotation of MG1. In addition, coordinate conversion portion 525 calculates a d-axis current Id(2) and a q-axis current Iq(2) of MG2, based on a motor current (a three-phase current) and an angle of rotation of MG2.

Voltage deviation calculation portion 532 calculates voltage deviation ΔVH*(1) of MG1 and ΔVH*(2) of MG2 by performing processing the same as in voltage deviation calculation portion 531 for each of MG1 and MG2.

Specifically, voltage deviation calculation portion 532 selects a target current phase line and a voltage deviation map corresponding thereto, similarly to voltage deviation calculation portion 531, in accordance with load level LVL(1) of MG1. In addition, voltage deviation calculation portion 532 calculates voltage deviation ΔVH*(1) corresponding to MG1 in accordance with a current phase (the d-q plane) defined by d-axis current Id(1) and q-axis current Iq(1) by using the voltage deviation map selected in accordance with load level LVL(1).

Voltage deviation calculation portion 532 selects a target current phase line and a voltage deviation map in accordance with load level LVL(2), similarly also for MG2, and calculates voltage deviation ΔVH*(2) in accordance with a current phase (the d-q plane) defined by d-axis current Id(2) and q-axis current Iq(2) by using the selected voltage deviation map.

It is noted that a target current phase line and a voltage deviation map corresponding thereto for each of load levels LVL(1), LVL(2) is selected as described in the variation of the first embodiment.

Extraction portion 538 extracts a maximum value of voltage deviations ΔVH*(1) and ΔVH*(2) calculated for MG1 and MG2 by voltage deviation calculation portion 532, respectively, and defines voltage deviation ΔVH*. Control operation portion 540 calculates VH correction value VHh through control operation (PI operation) based on voltage deviation ΔVH*, as described in the first embodiment.

Since the function of operation portion 550 is the same as in the first embodiment, detailed description will not be repeated.

Figure 25:
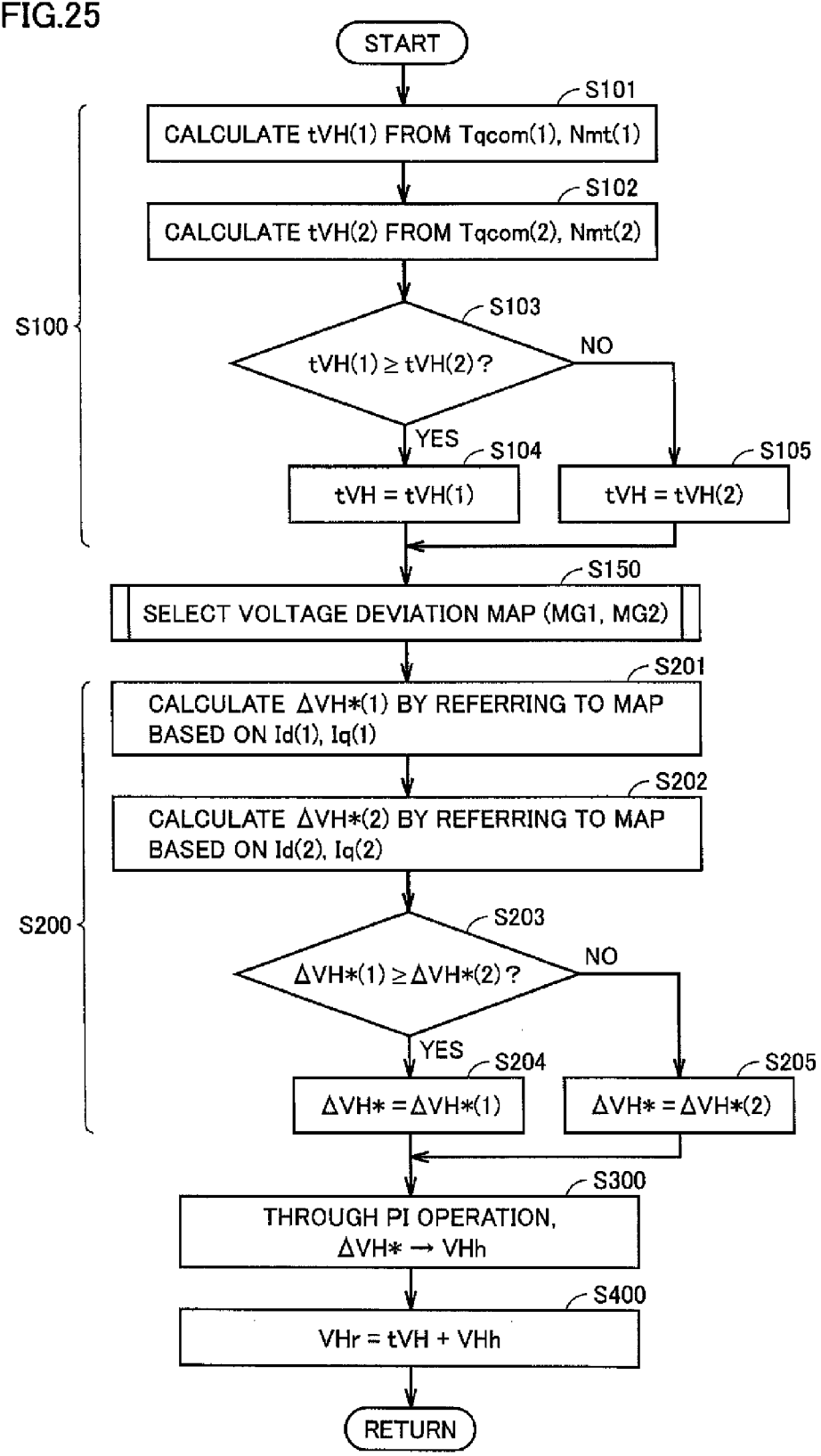
FIG. 25 is a flowchart for illustrating control processing involved with setting of a voltage command value for a system voltage according to the second embodiment.

FIG. 25 is a flowchart for illustrating control processing involved with setting of a voltage command value for a system voltage according to the second embodiment. As the control processing shown in FIG. 25 is performed in a prescribed cycle by control device 30, a function of VH command value setting portion 502 shown in FIG. 23 is implemented.

Referring to FIG. 25, control device 30 performs steps S101 to S105 in order to perform processing equivalent to that in step S100 in the first embodiment (FIG. 12).

Control device 30 calculates in step S101, base command value tVH(1) corresponding to MG1 by using the tVH map (FIG. 10) shown in the first embodiment, based on torque command value Tqcom(1) and rotation speed Nmt(1) of MG1. Similarly, control device 30 calculates in step S102, base command value tVH(2) corresponding to MG2, based on torque command value Tqcom(2) and rotation speed Nmt(2) of MG2.

Control device 30 compares in step S103, tVH(1) and tVH(2) with each other. When relation of tVH(1)≥tVH(2) is satisfied (YES in S103), control device 30 sets tVH=tVH(1) (step S104), whereas when relation of tVH(2)>tVH(1) is satisfied (NO in S103), it sets tVH=tVH(2) (step S105). Thus, a maximum value of tVH(1) and tVH(2) is set as base command value tVH for MG1, MG2 as a whole. Thus, through the processing in steps S101 to S105, a function of base command value generation portion 512 shown in FIG. 23 is implemented.

In addition, control device 30 selects in step S150, a voltage deviation map for each of MG1 and MG2.

Figure 26:
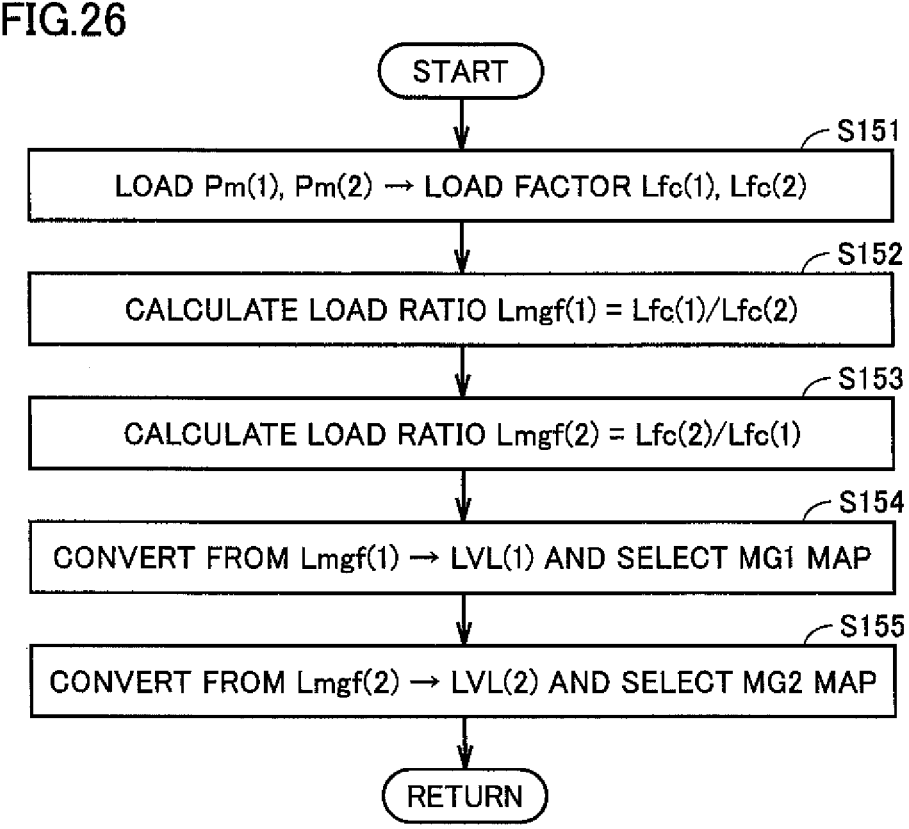
FIG. 26 is a flowchart illustrating in detail processing for selecting a voltage deviation map in the flowchart shown in FIG. 25.

FIG. 26 shows details of control processing in step S150.

Referring to FIG. 26, control device 30 calculates in step S151, load factors Lfc(1), Lfc(2) from output electric power Pm(1), Pm(2), for MG1 and MG2, in accordance with the equations (6), (7). In addition, control device 30 calculates in steps S152, S153, load ratios Lmgf(1), Lmgf(2) of MG1 and MG2, in accordance with the equations (8), (9). Thus, loads of MG1 and MG2 are compared with each other, and a load ratio is set to be high in an MG relatively higher in load.

Control device 30 sets in step S154, load level LVL(1) of MG1 from load ratio Lmgf(1), by using the map illustrated in FIG. 24. As described in the variation of the first embodiment, a target current phase line (FIG. 15) in accordance with a state of load of MG1 and a voltage deviation map corresponding thereto are selected based on load level LVL(1).

Similarly, control device 30 sets in step S155, load level LVL(2) of MG2 from load ratio Lmgf(2). Thus, as in MG1, a target current phase line (FIG. 15) in accordance with a state of load and a voltage deviation map corresponding thereto are selected based on load level LVL(2) also for MG2. Through the processing in steps S151 to S155 shown in FIG. 26, a function of map selection portion 536 in FIG. 23 is implemented.

Referring again to FIG. 25, control device 30 performs steps S201 to S205 in order to perform processing equivalent to that in step S200 in the first embodiment (FIG. 12).

Control device 30 calculates in step S201, voltage deviation ΔVH*(1) in accordance with a current phase defined by d-axis current Id(1) and q-axis current Iq(1) of MG1. Thus, voltage deviation ΔVH*(1) for brining a current phase of MG1 closer to a target current phase line in accordance with a state of load is calculated by using the voltage deviation map selected based on load level LVL(1).

Control device 30 calculates in step S202, voltage deviation ΔVH*(2) in accordance with a current phase defined by d-axis current Id(2) and q-axis current Iq(2) of MG2. Thus, voltage deviation ΔVH*(2) for brining a current phase of MG2 closer to a target current phase line in accordance with a state of load is calculated by using the voltage deviation map selected based on load level LVL(2). Through the processing in steps S201 to S202, a function of voltage deviation calculation portion 532 in FIG. 23 is implemented.

Control device 30 compares in step S203, voltage deviation ΔVH*(1) calculated in step S201 and ΔVH*(2) calculated in step S202 with each other. Then, when relation of ΔVH*(1) ≥ΔVH*(2) is satisfied (YES in S203), control device 30 sets voltage deviation ΔVH* for MG1, MG2 as a whole=ΔVH*(1) (step S204). On the other hand, when relation of ΔVH*(1)<ΔVH*(2) is satisfied (NO in S203), control device 30 sets ΔVH*=ΔVH*(2) (step S205). Namely, voltage deviation ΔVH* of MG1 and MG2 as a whole is set in accordance with a maximum value of ΔVH*(1) and ΔVH*(2). Through the processing in steps S203 to S205, a function of extraction portion 538 in FIG. 23 is implemented.

In addition, control device 30 sets voltage command value VHr in steps S300 and S400 similar to those in FIG. 12.

In accordance with voltage command value VHr thus set, boost converter 12 controls system voltage VH. Since contents of control of boost converter 12 by VH control unit 600 are the same as in the first embodiment, detailed description will not be repeated.

Thus, in the control system for the AC motor according to the present second embodiment, in an electrically-powered vehicle configured such that a plurality of inverters common in a DC link voltage (system voltage VH) control a plurality of AC motors respectively, a system voltage can be set such that current phases of a plurality of AC motors are brought closer to target current phases in accordance with states of load, respectively. Thus, system voltage VH can be set so as to lower loss in the overall control system, following change in state of load of each AC motor.

It is noted that application of the control system for the AC motor according to the present embodiment is not limited to control of the motor for running of the electrically-powered vehicle as illustrated. The control system for the AC motor according to the present embodiment is applicable to any electrically-powered vehicle without a construction of a powertrain being limited, so long as it is configured to control an AC motor by applying rectangular wave voltage control by using an inverter of which DC link voltage (system voltage VH) is variably controlled by a converter, and it is also applicable to an AC motor used for a vehicle other than an electrically-powered vehicle.

In particular, application of the control system for the AC motor according to the second embodiment is not limited to the hybrid vehicle shown in FIG. 19. Namely, so long as the configuration is such that a plurality of inverters common in a DC link voltage (system voltage VH) control a plurality of AC motors respectively, the control system for the AC motor according to the second embodiment can control any AC motor.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A control system for an AC motor, comprising:
   a boost converter configured to carry out DC power conversion between a DC power supply and a power line such that a DC voltage of the power line is controlled in accordance with a voltage command value;
   an inverter configured to convert a DC voltage on said power line to an AC voltage to be applied to the AC motor; and
   a voltage command value setting portion configured to modify said voltage command value in accordance with a current phase on a d-q axis plane of a motor current which flows through said AC motor during application of rectangular wave voltage control in which a rectangular wave voltage is applied from said inverter to said AC motor and output torque of said AC motor is controlled by a voltage phase of said rectangular wave voltage,
   said voltage command value setting portion modifying said voltage command value such that said current phase is brought closer to a target current phase line, and modifying said voltage command value so as to raise said DC voltage when said current phase is on a first side of d-q axis plane relative to the target current phase line, while modifying said voltage command value so as to lower said DC voltage when said current phase is on a second side of said d-q axis plane relative to the target current phase line,
   first side of said d-q axis plane being a side of said d-q axis plane in a first direction, and the second side of said d-q axis plane being a side of said d-q axis plane in a second direction, and
   said target current phase line being set on said d-q axis plane, on the first side of said d-q axis plane relative to an optimal current phase line, which is a set of current phases at which output torque is maximized having identical maximum amplitude of said motor current.

2. The control system for an AC motor according to claim 1, wherein
   said voltage command value setting portion is configured to vary said target current phase line in accordance with a state of load of said AC motor.

3. The control system for an AC motor according to claim 2, wherein
   said voltage command value setting portion is configured to vary said target current phase line toward the advance side relative to said optimal current phase line as the load of said AC motor is lower, while it is configured to bring said target current phase line closer to said optimal current phase line as load of said AC motor is higher.

4. The control system for an AC motor according to claim 1, configured such that a plurality of said AC motors are electrically connected to common said power line through a plurality of said inverters, respectively, wherein
   said voltage command value setting portion includes a calculation portion for calculating an amount of voltage modification in accordance with a difference between said target current phase line set in accordance with a state of load of the AC motor for each said AC motor and present said current phase, for each of said plurality of AC motors, and a modification portion for modifying said voltage command value based on a maximum value of said amounts of voltage modification for respective ones of said plurality of AC motors.

5. The control system for an AC motor according to claim 4, wherein said voltage command value setting portion sets, in accordance with a load ratio among said plurality of AC motors, said target current phase line of said AC motor relatively low in load toward the first side of the d-q axis plane, while it sets said target current phase line of said AC motor relatively high in load toward the second side of the d-q axis plane.

6. The control system for an AC motor according to claim 1, wherein output torque of said AC motor is controlled with feedback control of said motor current during application of pulse width modulation control in which an AC voltage in accordance with the pulse width modulation control is applied from said inverter to said AC motor, and a current command value in said feedback control is set to have a current phase on said optimal current phase line.

7. The control system for an AC motor according to claim 2, wherein output torque of said AC motor is controlled with feedback control of said motor current during application of pulse width modulation control in which an AC voltage in accordance with the pulse width modulation control is applied from said inverter to said AC motor, and a current command value in said feedback control is set to have a current phase on said optimal current phase line.

8. The control system for an AC motor according to claim 3, wherein output torque of said AC motor is controlled with feedback control of said motor current during application of pulse width modulation control in which an AC voltage in accordance with the pulse width modulation control is applied from said inverter to said AC motor, and a current command value in said feedback control is set to have a current phase on said optimal current phase line.

9. The control system for an AC motor according to claim 4, wherein output torque of said AC motor is controlled with feedback control of said motor current during application of pulse width modulation control in which an AC voltage in accordance with the pulse width modulation control is applied from said inverter to said AC motor, and a current command value in said feedback control is set to have a current phase on said optimal current phase line.

10. The control system for an AC motor according to claim 5, wherein output torque of said AC motor is controlled with feedback control of said motor current during application of pulse width modulation control in which an AC voltage in accordance with the pulse width modulation control is applied from said inverter to said AC motor, and a current command value in said feedback control is set to have a current phase on said optimal current phase line.

* * * * *